US006549919B2

(12) United States Patent
Lambert et al.

(10) Patent No.: US 6,549,919 B2
(45) Date of Patent: Apr. 15, 2003

(54) METHOD AND APPARATUS FOR UPDATING RECORDS IN A DATABASE SYSTEM BASED ON AN IMPROVED MODEL OF TIME-DEPENDENT BEHAVIOR

(75) Inventors: Diane Lambert, Berkeley Heights, NJ (US); José C. Pinheiro, Chatham, NJ (US); Don X. Sun, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 242 days.

(21) Appl. No.: 09/733,656

(22) Filed: Dec. 8, 2000

(65) Prior Publication Data

US 2003/0028502 A1 Feb. 6, 2003

Related U.S. Application Data

(60) Provisional application No. 60/194,316, filed on Apr. 3, 2000.

(51) Int. Cl.$^7$ ............................................... G06F 17/30
(52) U.S. Cl. ........................................................ 707/203
(58) Field of Search ................................ 707/203, 102, 707/200; 705/60; 710/317; 725/22

(56) References Cited

U.S. PATENT DOCUMENTS

| | | | |
|---|---|---|---|
| 5,870,752 A | | 2/1999 | Gibbons et al. |
| 5,907,602 A | * | 5/1999 | Peel et al. ............. 379/114.14 |
| 5,912,905 A | * | 6/1999 | Sakai et al. .................. 714/784 |
| 6,012,064 A | * | 1/2000 | Gibbons et al. ........ 707/103 R |
| 6,381,589 B1 | * | 4/2002 | Leon ........................... 705/60 |

OTHER PUBLICATIONS

F. Chen et al., "Incremental Quantile Estimation For Massive Tracking," Proceedings of KDD–2000, pp. 516–522, 2000.
M. West et al., "Introduction to the DLM: The First–Order Polynomial Model," Bayesian Forecasting and Dynamic Models, Chapter 2, Springer Verlag, pp. 37–55, 1989.
B. Abraham et al., "Locally Constant Mean Model and Simple Exponential Smoothing," Statistical Methods for Forecasting, John Wiley and Sons, pp. 85–89, 1983.
P.B. Gibbons et al., "Fast Incremental Maintenance of Approximate Histograms," Proceedings of the 23rd VLDB Conference, Athens, Greece, 5 pages, 1997.

* cited by examiner

Primary Examiner—Safet Metjahic
Assistant Examiner—Sana Al-hashemi
(74) Attorney, Agent, or Firm—Ryan, Mason & Lewis, LLP

(57) ABSTRACT

A customer signature or other type of record in a database system is updated using an event-driven estimator based on a model of time-dependent behavior. In a preferred embodiment, a current version of a record affected by a given transaction is retrieved from a memory of the system and an event-driven estimator of at least one of a transaction rate and a period probability for the record is determined based at least in part on a dynamic Poisson timing model having a number of periods and corresponding period-based transaction rates associated therewith. The event-driven estimator may be configured so as to generate an estimated transaction rate $\hat{\lambda}_{j,n}$ for period j and a given transaction n, and then to generate an estimated period probability $\hat{\pi}_{j,n}$ for period j as $\hat{\lambda}_{j,n}/\Sigma_k \hat{\lambda}_{k,n}$. An updated version of the record may then be generated based on the event-driven estimator.

25 Claims, 8 Drawing Sheets

|   | MLE | EDE | | |
| --- | --- | --- | --- | --- |
| $\lambda$ |  | $w = .02$ | $w = .05$ | $w = .1$ |
| 1 | .25 (.16,.57) | .04 (.01,.05) | .07 (.03,.08) | .11 (.06,.13) |
| 5 | .11 (.07,.24) | .05 (.02,.06) | .09 (.06,.1) | .13 (.08,.14) |
| 10 | .08 (.05,.17) | .05 (.03,.06) | .09 (.08,.1) | .13 (.09,.14) |
| 20 | .05 (.04,.12) | .05 (.03,.06) | .09 (.07,.09) | .13 (.11,.14) |

FIG. 7

|   | MLE | EDE | | |
| --- | --- | --- | --- | --- |
| $\lambda$ |  | $w = .02$ | $w = .05$ | $w = .1$ |
| 1 | .27 (.20,.58) | .11 (.04,.15) | .1 (.03,.13) | .13 (.05,.16) |
| 5 | .18 (.17,.26) | .15 (.05,.19) | .14 (.07,.16) | .16 (.08,.18) |
| 10 | .21 (.16,.28) | .18 (.08,.21) | .15 (.08,.16) | .16 (.13,.18) |
| 20 | .30 (.17,.49) | .20 (.11,.21) | .15 (.09,.16) | .16 (.13,.18) |

FIG. 10

METHOD AND APPARATUS FOR UPDATING RECORDS IN A DATABASE SYSTEM BASED ON AN IMPROVED MODEL OF TIME-DEPENDENT BEHAVIOR

PRIORITY CLAIM

The present application claims the benefit of U.S. Provisional Application No. 60/194,316, filed Apr. 3, 2000 and entitled "Method for Updating Records Based on an Improved Model of Time-Dependent Behavior."

FIELD OF THE INVENTION

The invention relates generally to techniques for processing information in a database system, and more particularly to techniques for updating customer signatures or other types of records in a database system.

BACKGROUND OF THE INVENTION

It is desirable in many business applications of database systems to track separately the transaction behavior of each customer. This tracking may be implemented using a customer-specific record referred to herein as a customer signature. For example, a customer signature for buying behavior may contain information on the likely place of purchase, value of goods purchased, type of goods purchased, and timing of purchases for the given customer. The signature may be updated whenever the customer makes a transaction, and, because of storage limitations, the updating may be able to use only the new transaction and the summarized information in the current customer signature.

The above-described customer signatures may be provided using relative frequency distributions. Such distributions are also commonly known as histograms. Updating histograms sequentially is not difficult when observations are randomly sampled. If $\hat{\pi}_n$ is a vector of current histogram probabilities and $X_{n+1}$ is a characteristic of a current transaction, represented as a vector of 0's except for a 1 in a cell containing an observed value, then the sequentially updated vector of histogram probabilities is $$\hat{\pi}_{n+1} = (1-w_{n+1})\hat{\pi}_n + w_{n+1}X_{n+1}, \quad (1)$$

where $w_{n+1}=1/(n+1)$ and $\hat{\pi}_0=0$. Updating thus requires only the most recent transaction, the number of transactions made so far and the current summary. This is known as an unweighted average, because $\hat{\pi}_n$ weights each observed transaction $X_1, \ldots, X_n$ equally.

In cases of time-dependent customer behavior, a histogram updated using an unweighted average is generally inappropriate because recent transactions have no more influence on the histogram than old transactions do. Such time-dependent behavior is tracked better by an exponentially weighted moving average (EWMA). An updated EWMA vector $\hat{\pi}_{n+1}$ is given by equation (1) with $w_{n+1}=w$ for a fixed weight w, $0<w<1$, that controls the extent to which $\hat{\pi}_{n+1}$ is affected by a new transaction and the speed with which a previous transaction is "aged out." The initial probability estimate $\hat{\pi}_0$ must be specified, and can be determined, e.g., from historical data on other customers. Under some conditions, an EWMA approximates the corresponding posterior mean under a Bayesian dynamic model, as described in M. West et al., "Bayesian Forecasting and Dynamic Models," Springer-Verlag, 1989. Additional details regarding EWMA can be found in B. Abraham et al., "Statistical Methods for Forecasting," John Wiley & Sons, New York, N.Y., 1983.

It is important to note that the unweighted averages and EWMAs are generally appropriate only when variables are randomly sampled. However, timing variables like day-of-week are typically not randomly sampled. As a result, standard sequential estimates of their distributions can be badly biased. For example, if the transaction rate on Monday is high and the most recent transaction occurred early Monday morning, then the next transaction is likely to occur on Monday and unlikely to occur on Tuesday or any day of the week other than Monday. Because unweighted averages and EWMAs increase the estimated probability for a histogram cell every time that cell is observed, the estimated probability for Monday first rises with every transaction made on Monday and then falls with every transaction made before the following Monday.

As is apparent from the foregoing, a need exists for techniques for updating customer signatures or other records of time-dependent behavior in the presence of timing variables that are not randomly sampled.

SUMMARY OF THE INVENTION

The present invention provides improved techniques for updating customer signatures or other types of records in a database system.

In accordance with one aspect of the invention, a customer signature or other type of record in a database system is updated using an event-driven estimator based on a model of time-dependent behavior. A current version of a record affected by a given transaction is retrieved from a memory of the system and an event-driven estimator of at least one of a transaction rate and a period probability for the record is determined based at least in part on a dynamic Poisson timing model. The dynamic model has a number of periods and corresponding period-based transaction rates associated therewith. The event-driven estimator may be configured so as to generate an estimated transaction rate $\hat{\lambda}_{j,n}$ for period j and a given transaction n, and then to generate an estimated period probability $\hat{\pi}_{j,n}$ for period j as $\hat{\lambda}_{j,n}/\Sigma_k \hat{\lambda}_{k,n}$. An updated version of the record may then be generated based on the event-driven estimator.

In accordance with another aspect of the invention, a number of different techniques may be used to update the event-driven estimator. As one example, the event-driven estimator may be updated for every transaction in a specified period and at the end of each of the periods. As another example, the event-driven estimator may be updated for every transaction, regardless of which of the periods any particular transaction falls in, but not at the end of each of the periods. As yet another example, the event-driven estimator may be updated for a given one of the periods only when there is a transaction occurring within that period.

In accordance with a further aspect of the invention, the estimated transaction rate $\hat{\lambda}_{j,n}$ provided by the event-driven estimator under the dynamic Poisson timing model satisfies $$\hat{\lambda}_{j,n}^{-1} = \begin{cases} (1-w)\hat{\lambda}_{j,n-1}^{-1} + wZ_{j,n}, & \text{if transaction } n \text{ falls in period } j \\ \hat{\lambda}_{j,n-1}^{-1} + \dfrac{w}{1-w}Z_{j,n}, & \text{if transaction } n \text{ does not fall in period } j, \end{cases}$$

wherein w denotes a specified updating weight, $Z_{j,n}$ is an elapsed time in period j since a previous transaction $n-1$, and $\hat{\lambda}_{j,n}^{-1}$ is a reciprocal rate that estimates the average time between transactions in period j.

Advantageously, the event-driven estimator of the present invention is both computationally efficient and memory efficient. It provides better sequential estimates of timing distributions used for customer signatures or other records than the conventional unweighted average and exponentially weighted moving average (EWMA) described previously, and yet is nearly as simple to compute as an EWMA.

BRIEF DESCRIPTION OF THE DRAWINGS

FIG. 7 is a tabular listing of sample standard deviations for the absolute relative error curves of FIG. 6.

FIG. 10 is a tabular listing of sample standard deviations for a portion of the absolute relative error curves of FIG. 9.

DETAILED DESCRIPTION OF THE INVENTION

The present invention will be illustrated below in conjunction with exemplary database systems. It should be understood, however, that the invention is not limited to use with any particular type of database system or system configuration, but is instead more generally applicable to any data storage application in which it is desirable to provide efficient updating of database records involving time-dependent behavior. The term "database system" should be understood to include any type of system in which data items or other types of records are stored and processed in one or more physical locations. A "record" as the term is used herein is intended to include not only information stored in a single memory or other storage device, but also a set of related information that is stored in a distributed manner across multiple storage devices. The term "memory" as used herein is intended to encompass single storage devices as well as co-located or distributed arrangements of multiple storage devices.

Example Database Systems

Figure 1:
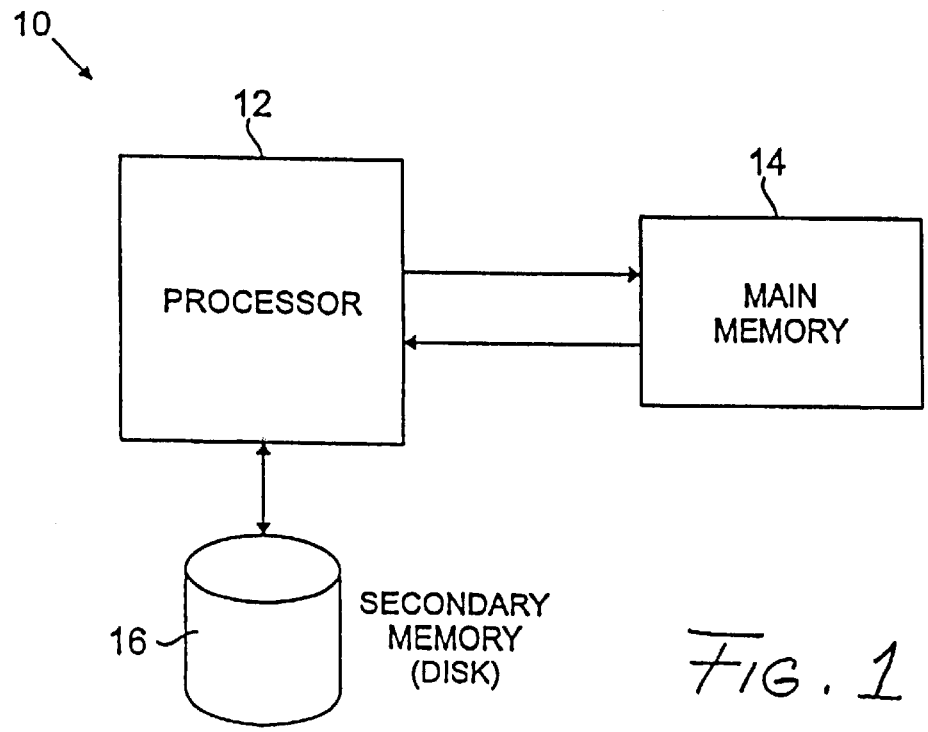
FIG. 1 shows an exemplary database system in which record updating may be implemented in accordance with the invention.

FIG. 1 shows an exemplary database system 10 in which the record updating techniques of the invention may be implemented. The system 10 includes a processor 12 connected to communicate with a main memory 14 and a secondary memory 16. The processor 12 can be implemented as a personal, micro or mainframe computer, a workstation, a microprocessor, a central processing unit, an application-specific integrated circuit (ASIC) or other digital data processor, as well as various portions or combinations of these and other devices. The main memory 14 is typically an electronic memory associated with the processor 12. The secondary memory 16 is typically an external magnetic or optical disk-based memory, but may also be a magnetic tape memory, an electronic memory, or other suitable data storage device. The main and secondary memories of the system 10 may represent storage locations of data warehouses, data marts or other large databases having storage capacities of up to a few terabytes, smaller localized database memories, or even memories associated with desktop or portable computers, depending upon the particular application in which the invention is implemented.

The record updating techniques of the invention, which will be described in greater detail below, may be implemented at least in part as one or more software programs stored in portions of one or both of the memories 14 and 16, and executed by processor 12. The software programs may be configured to generate and maintain customer signatures or other records for a database or databases associated with one or both of the memories 14 and 16. For example, such programs may be used to generate and maintain histograms for each of a number of different customers or other users associated with the system 10. The system 10 may also utilize processor 12 and memories 14, 16 to provide conventional database processing capabilities such as those described in, for example, H. F. Korth and A. Silberschatz, "Database System Concepts," Third Edition, McGraw-Hill, N.Y., 1997, and R. Elmasri and S. B. Navathe, "Fundamentals of Database Systems," Benjamin/Cummings, Redwood City, Calif., 1989, both of which are incorporated by reference herein.

Figure 2:
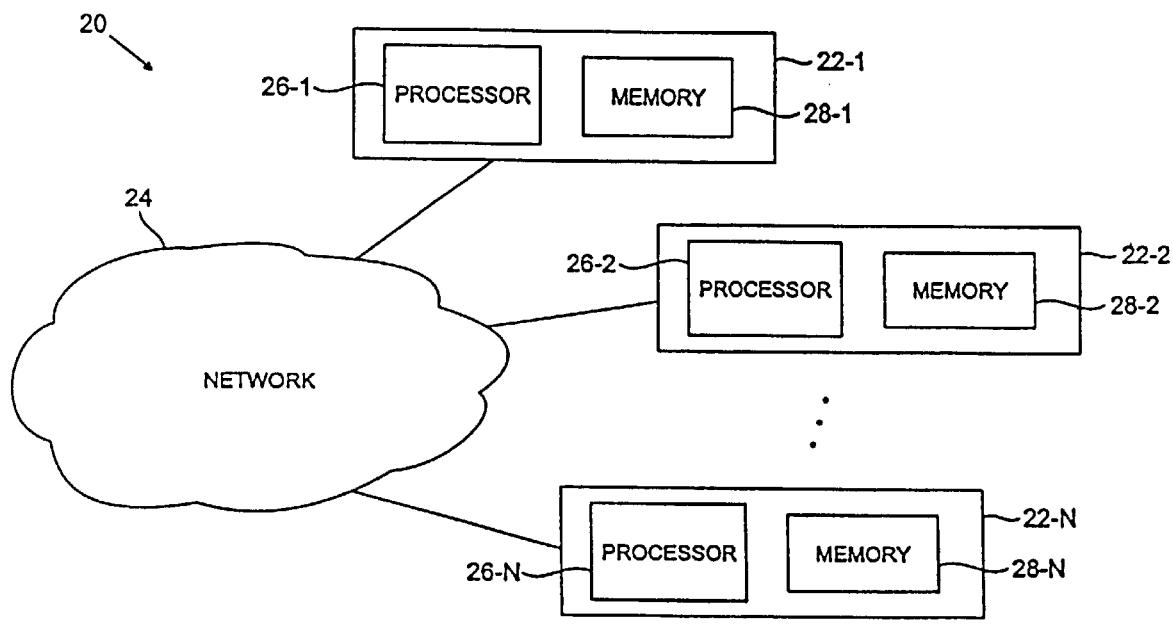
FIG. 2 shows a distributed database system in which record updating may be implemented in accordance with the invention.

FIG. 2 shows an exemplary distributed database system 20 in which the record updating techniques of the invention may be implemented. The system 20 includes N physical sites $22\text{-}i$, i=1, 2, . . . N connected by a network 24. The network 24 may be a local area network, a metropolitan area network, a wide area network, a global data communications network such as the Internet, a private "intranet" network or any other suitable data communication medium. The sites $22\text{-}i$ may be centralized database systems such as data warehouses or data marts, remote customer sites such as automatic teller machines or desktop personal computers, portable computers or other mobile computing devices, or any other type of data processors. Each of the N sites $22\text{-}i$ includes a processor $26\text{-}i$ and a memory $28\text{-}i$. The memory $28\text{-}i$ may be, for example, a large centralized a database system, or a memory of a desktop or portable personal, depending upon the nature of the corresponding physical site $22\text{-}i$. One or more of the memories $28\text{-}i$ may be configured to include both a primary memory 14 and a secondary memory 16 as shown in FIG. 1. The processors $26\text{-}i$ may each run a local database management system (DBMS). Like the processor 12 of FIG. 1, the processors $26\text{-}i$ can be implemented as personal, micro or mainframe computers, workstations, microprocessors, central processing units, ASICs or other digital data processors, as well as various portions or combinations thereof.

The memories 28-$i$ may utilize electronic, magnetic or optical storage media, or various combinations thereof, and as previously noted may represent storage locations of data warehouses or data marts having storage capacities of up to a few terabytes, or memories of desktop or portable computers. The storage and retrieval of data items from a memory 28-$i$ of a given site 22-$i$ are controlled by the corresponding processor 26-$i$ using the local DBMS. The sites 22-$i$ of system 20 may each run multiple transactions, such as read and write transactions, during which data items stored at other sites are accessed and processed in accordance with insert, delete and modify operations. One or more oft he sites 22-$i$ of FIG. 2 may execute a software program which generates and maintains histograms for records in a database or databases associated with one or more of the memories 28-$i$.

Event-Driven Estimator

The present invention in an illustrative embodiment provides a fast, memory-efficient sequential estimator suitable for use in updating customer signatures or other records in database systems of the type described in conjunction with FIGS. 1 and 2 above. The sequential estimator of the illustrative embodiment is referred to herein as an event-driven estimator (EDE), since it is updated each time a transaction occurs. It is based on a dynamic Poisson model of time-dependent behavior that has periodic rates that may evolve over time. The EDE approximates the posterior mean under the dynamic Poisson timing model and has good asymptotic properties. Simulations show that it also has good finite sample properties. An application to sequentially tracking the day-of-week calling patterns of a random sample of about 2,000 telecommunications customers over a three month period will be described below and demonstrates that the dynamic Poisson model assumptions in the illustrative embodiment are adequate and that the corresponding EDE is useful in practice.

The EDE estimates the transaction rate $\lambda_{j,n}$ for period j at the time of a given transaction n, and then estimates the period probability $\pi_{j,n}$ for period j by $$\hat{\lambda}_{j,n} / \sum_k \hat{\lambda}_{k,n},$$

where $\hat{\lambda}_{j,n}$ denotes the estimated transaction rate. As will be described in greater detail below, the estimated transaction rate, $\hat{\lambda}_{j,n}$, for $\lambda_{j,n}$ under the above-noted dynamic Poisson model satisfies $$\hat{\lambda}_{j,n}^{-1} = \begin{cases} (1-w)\hat{\lambda}_{j,n-1}^{-1} + wZ_{j,n}, & \text{if transaction } n \text{ falls in period } j \\ \hat{\lambda}_{j,n-1}^{-1} + \frac{w}{1-w}Z_{j,n}, & \text{if transaction } n \text{ does not fall in period } j, \end{cases} \quad (2)$$

where $Z_{j,n}$ is the time that has elapsed in a period j since the previous transaction n−1.

Figure 3:
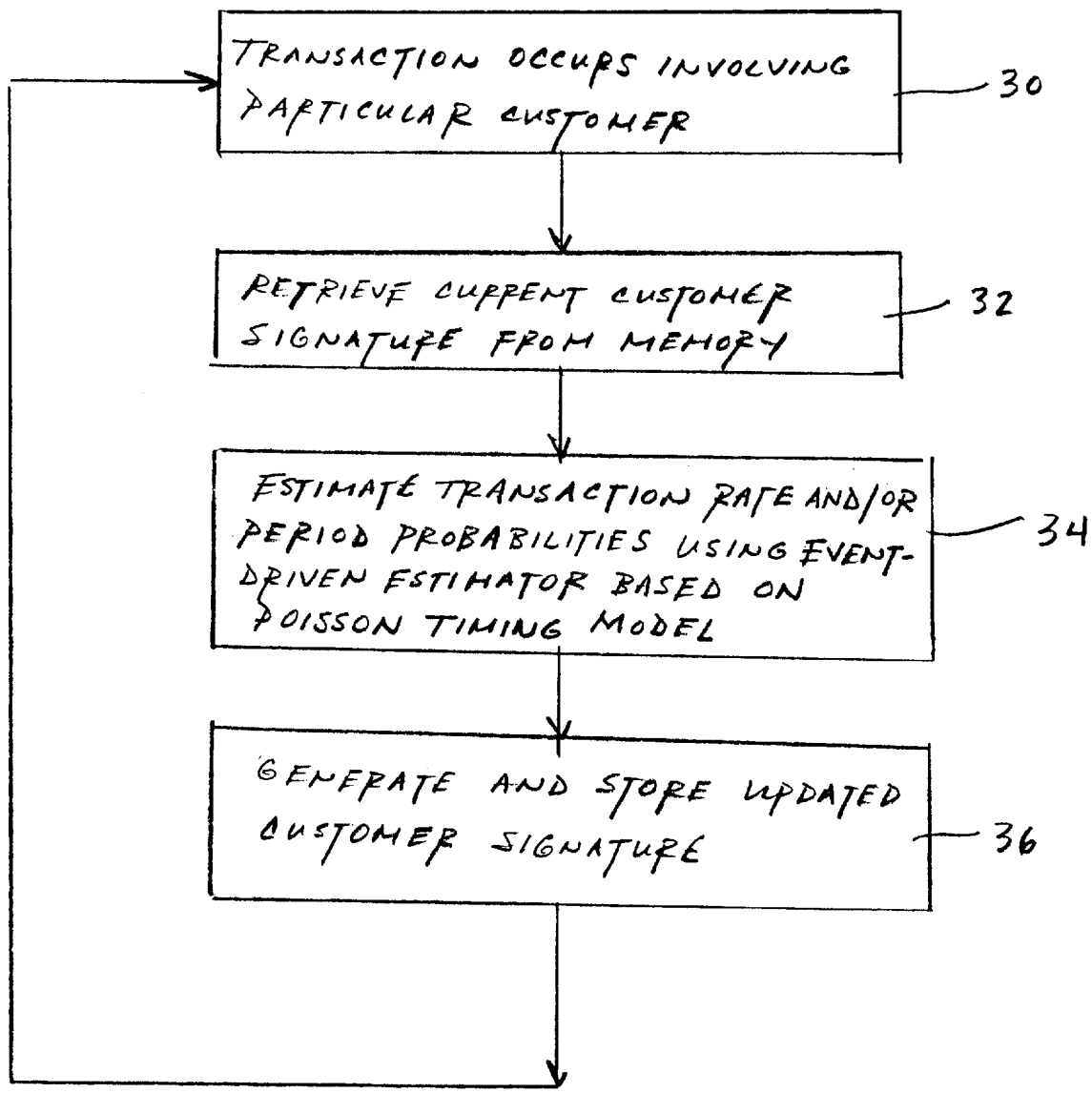
FIG. 3 is a flow diagram of an example record updating process in accordance with the invention.

FIG. 3 is a flow diagram of a record updating process that may be implemented in the database systems of FIGS. 1 and 2 in accordance with the present invention. This process involves updating a record in the form of a customer signature using the above-noted EDE, but can be readily extended to other types of records. In step 30, a transaction occurs involving a particular customer. The current customer signature for the particular customer is retrieved from memory in step 32. This memory may be main memory 14 of FIG. 1 or one of the memories 28 of FIG. 2 or any other suitable storage device. In step 34, the transaction rate and/or period probabilities for the customer signature are estimated using the EDE based on the above-noted dynamic Poisson timing model. In step 36, the EDE from step 34 is used to generate an updated customer signature, and the resulting updated customer signature is then stored in memory. After step 36, the process returns to step 30 to await another transaction.

Advantageously, the EDE utilized in the updating process of FIG. 3 provides better sequential estimates of timing distributions used for customer signatures than the conventional unweighted average and exponentially weighted moving average (EWMA) described previously, and yet is nearly as simple to compute as an EWMA.

Figure 4:
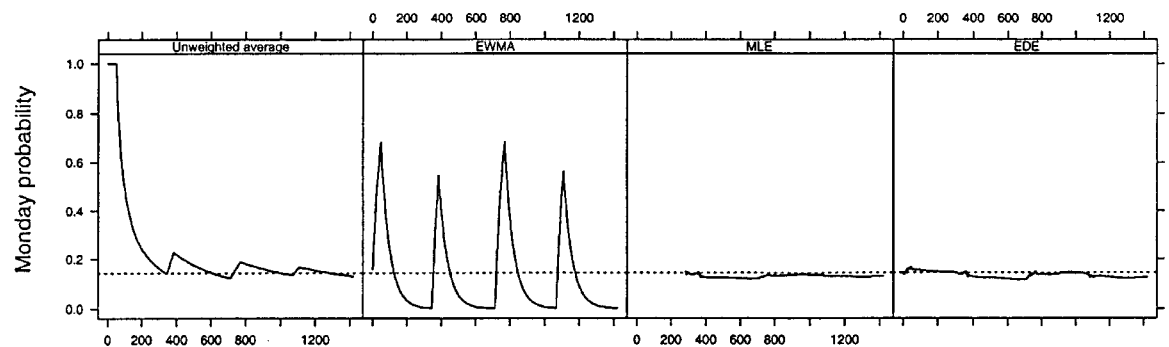
FIG. 4 compares the performance of an example event-driven estimator (EDE) in accordance with an illustrative embodiment of the invention with conventional unweighted average, exponentially weighted moving average (EWMA) and maximum likelihood estimator (MLE) performance.

FIG. 4 shows a set of plots comparing the performance of the EDE with that of an unweighted average, an EWMA and a maximum likelihood estimator (MLE). The Monday probability associated with a day-of-week timing variable is plotted for each of these sequential estimators as a function of transaction number using simulated transaction data. The periodic behavior of these estimators is an artifact that reflects only the order in which transactions are made. The sequential probability estimates for Monday cover a four-week period, and transactions for each day of the week are assumed to follow a Poisson (50) distribution. The nominal probability of each day, 1/7, is indicated by a dashed line in each panel of the figure.

The first panel of FIG. 4 shows the unweighted average. The second panel of the figure shows the EWMA with w=0.02 and an initial probability of 1/7 for each weekday. Both the unweighted average and the EWMA estimated probability for Monday peaks at the end of Monday and then slowly falls during the rest of the week until the first transaction made on the following Monday. The pattern dampens for unweighted averaging over time because eventually each observation is given only a small uniform weight. For comparison, the third panel shows the MLE for the simulated Poisson model. These estimates cannot be computed without a full week of data and do not adapt as behavior evolves.

The fourth panel of FIG. 4 shows the EDE of the illustrative embodiment of the invention, using weight w=0.02 and initial rates $\lambda_{j,0}$=40, j=1, . . . , 7. Clearly, the EDE avoids the extreme periodic bias of the unweighted average and EWMA. Moreover, the EDE is very close to the exact MLE for the simulated Poisson process. As previously noted, however, the MLE is not appropriate for sequentially estimating timing distributions for a volatile database because in the FIG. 3 example it cannot be computed until a full week after the first transaction has passed and it does not adapt to evolving behavior.

The EDE exhibits a number of advantageous characteristics of the EWMA, i.e., simplicity, ability to adapt to evolving behavior, and minimal storage requirements. Moreover, the EDE is approximately optimal under a dynamic Poisson timing model, in the sense that it approximates the posterior mean under a particular dynamic Poisson timing model. Computing the EDE is similar to computing an EWMA, except that the rate for each period, not just the rate for the observed period, is updated whenever there is a transaction. The updated estimate for the observed period is a weighted average of the previous reciprocal rate and the time since the last transaction in period j. The updated reciprocal rate estimate for any other period increases by the amount of time that has been spent in the period since the last transaction. The reciprocal rate $\hat{\lambda}_{j,n}^{-1}$ estimates the average time between transactions in period j.

Poisson Timing Model for Deterministic Transaction Rates

A Poisson timing model will now be described for the case of transaction rates that are constant within a given period or otherwise evolve deterministically over time. Suppose that calendar time is broken into a sequence of cycles, each of duration τ, and that each cycle is broken into J periods with fixed, but possibly unequal, lengths. For example, a cycle may last a week and have the J=3 periods {Monday, . . . , Friday}, {Saturday} and {Sunday}. Transaction i occurs at a calendar time $T_i$ during a period $R_i \in \{1, \ldots, J\}$ of cycle $C_i$. The time required to complete period j is $\delta_j$, and the time required to complete one cycle is $$\tau = \sum_{j=1}^{J} \delta_j.$$

Thus, a transaction at time $T_i$ falls in cycle $C_i = \lfloor T_i/\tau \rfloor + 1$, where $\lfloor x \rfloor$ denotes the greatest integer in x. It falls in period $R_i = j$ if $\Delta_{j-1} < T_i - (C_i - 1)\tau \leq \Delta_j$, where $$\Delta_j = \sum_{m=1}^{j} \delta_m$$

is the time from the start of the cycle to the end of period j and $\Delta_0 = 0$. Let $S_i = T_i - (C_i - 1)\tau - \Delta_{R_i - 1}$ be the time spent in period $R_i$ up to $T_i$. The probabilities of interest are the probabilities of periods 1, . . . , J during cycle k when the times of transactions in each period of each cycle follow a Poisson process.

Let $N_{k,j}(u)$ be the number of transactions up to time u within period j of cycle k; i.e., the number of transactions between calendar times $(k-1)\tau + \Delta_{j-1}$ and $(k-1)\tau + \Delta_{j-1} + u$. Suppose that $\{N_{k,j}(u)\}$ is a truncated Poisson process with rate $\lambda_{k,j}$. That is, if the interval [u, u+v] falls entirely in period j of cycle k, then $$N_{k,j}(u+v) - N_{k,j}(u) \sim \text{Poisson } (\lambda_{k,j} v).$$

If $N_{k,j}$ (u) is independent of $N_{k',j'}$ (v) for k≠k' or j≠j', then the number of transactions $N_{k,j} = N_{k,j}(\delta_j)$ during period j of cycle k has a Poisson $(\lambda_{k,j} \delta_j)$ distribution. Also, the number of transactions $$N_k = \sum_{j} N_{k,j}$$

within cycle k has a Poisson $(\lambda_k)$ distribution, where $$\lambda_k = \sum_{j=1}^{J} \lambda_{k,j} \delta_j.$$

This is referred to as the Poisson timing model because the number of transactions $N_t$ up to a calendar time t that fall in period $j_t$ of cycle $k_t$ has a Poisson distribution with parameter $$\sum_{k<k_t} \lambda_k + \sum_{j<j_t} \lambda_{k_t,j} \delta_j + \lambda_{k_t,j_t} s$$

where $s = t - (k_t - 1)\tau - \Delta_{j_{di\ t-1}}$ is the time spent in period $j_t$. The conditional distribution of $N_{k,j}$ given $N_k$ is Binomial $(N_k, \lambda_{k,j} \delta_j / \lambda_k)$ because $$Pr(N_{k,j} = m | N_k = M) = \frac{Pr(N_{k,j} = m, N_k - N_{k,j} = M - m)}{Pr(N_k = M)}$$

$$= \frac{Pr(N_{k,j} = m) Pr(N_k - N_{k,j} = M - m)}{Pr(N_k = M)}$$

$$= \binom{M}{m} \left(\frac{\lambda_{k,j} \delta_j}{\lambda_k}\right)^m \left(1 - \frac{\lambda_{k,j} \delta_j}{\lambda_k}\right)^{M-m},$$

$$m = 0, \ldots, M.$$

The period probabilities $\pi_{k,1}, \ldots, \pi_{k,J}$ for cycle k then satisfy $$\pi_{k,j} = Pr(N_{k,j} = 1 | N_k = 1) = \frac{\lambda_{k,j} \delta_j}{\lambda_k}. \quad (3)$$

The model as described so far assumes that the transaction rate in each period of each cycle is an arbitrary constant $\lambda_{k,j}$. It is often more reasonable to assume that the transaction rates are constant across cycles, so that $\lambda_{k,j} = \lambda_{m,j}$ for all k, m, or to assume that the transaction rates evolve smoothly. For example, $\lambda_{k+1,j} = (1-\alpha)\lambda_{k,j} + \alpha$ for a small α in (0, 1). This kind of assumption justifies a sequential updating scheme in which transactions from previous cycles affect the estimates for the current cycle. The next section extends the above-described Poisson timing model for transaction rates that evolve deterministically over time to dynamic transaction rates that evolve randomly over time.

Poisson Timing Model for Dynamic Transaction Rates

As in the previous section, let $N_{k,j}$ be the number of transactions during period j of cycle k. It is now assumed that the transaction rate is dynamic, so a different rate applies to each transaction. Let $T_{k,j,0} i = 1, \ldots, N_{k,j}$, be the time of the $i^{th}$ transaction that falls in period j of cycle k. Let $T_{k,j} = (k-1)\tau + \Delta_{j-1}$ be the start of period j in cycle k and $T_{k,j,N_{k,j}+1} = (k-1)\tau + \Delta_j$ be the end of period j in cycle k.

Figure 5:
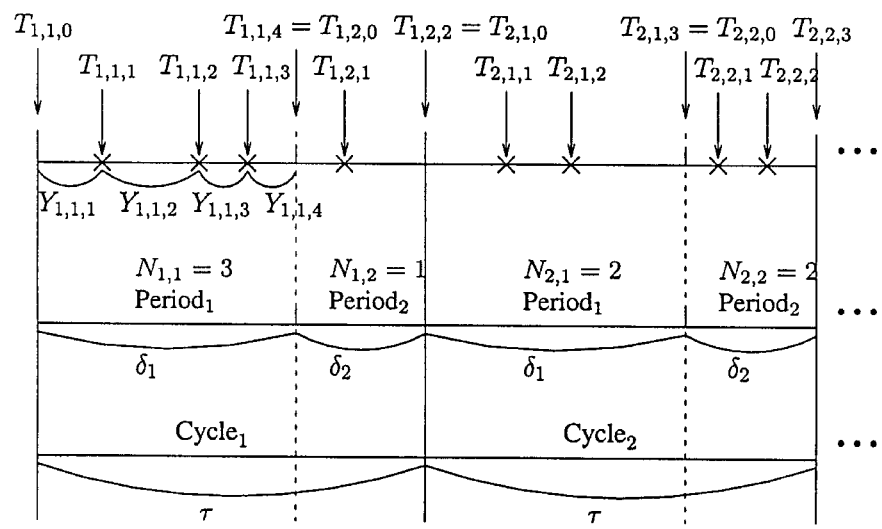
FIG. 5 is a diagram illustrating the structure of example data for a Poisson timing process with two periods.

FIG. 5 shows the structure of the data for an example of the above-described dynamic Poisson timing process with two periods. Note that $T_{i,j,k}$ is either the start of a period, the time of a transaction, or the time from the last transaction in the period to the end of the period.

The waiting times $Y_{k,j,i} = T_{k,j,i} - T_{k,j,i-1} i=1, \ldots, N_{k,j}$, between transactions in the same period of the same cycle are uncensored. At time $T_{k,j,N_{k,j}+1}$, the waiting time $Y_{k,j,N_{k,j}+1}$ from the last transaction in period j until the end of period j can be considered to be a censored waiting time because the period could no longer be observed. Let $Z_{k,j,N_{k,j}+1}$ be the uncensored waiting time for the end of period j in cycle k, that is, the transaction time that would have been observed if the period had continued to be observed. Including $Y_{k,j,N_{k,j}+1}$ in the model allows the information that no transaction was seen in a period to be used to update the rate for that period.

Under a Poisson timing model, $Y_{k,j,1} \ldots, Y_{k,j,N_{k,j}}$ are independent exponential random variables and $Y_{k,j,N_{k,j}+1}$ is a right-censored exponential. Under a dynamic Poisson timing model, the mean of the exponential distribution evolves randomly. Here it is assumed that the mean in effect at time $T_{k,j,i}$ is a random perturbation of the rate in effect at the time of the last transaction in period j prior to $T_{k,j,i}$. Thus, the transaction rate changes when and only when there is a transaction. The dynamic Poisson timing model is more precisely defined as follows:

$$Y_{k,j,i} \sim \text{exponential}(\lambda_{k,j,i}), i=1, \ldots, N_{k,j}$$

$$Y_{k,j,N_j+1} = \min(Z_{k,j,N_{k,j}+1}(k+1)\tau + \Delta_j - T_{k,j,N_{k,j}}),$$

$$Z_{k,j,N_{k,j}+1} \sim \text{exponential}(\lambda_{k,j,N_{k,j}+1})$$

$$\lambda_{k,j,i} = \begin{cases} \varepsilon_{k,j,i}\lambda_{k,j,i-1}, & i=2, \ldots, N_{k,j}+1, N_{k,j} \geq 1, \text{ or } i=1, k=1 \\ \lambda_{k,j,i-1}, & i=1, k>1 \end{cases} \quad (4)$$

where $\lambda_{k,j,0} = \lambda_{k-1,j,N_{k-1,j}+1}$ and $\lambda_{1,j,0}$ is a known constant. Note that the transaction rate for a period stays constant until a transaction occurs in that period, and then the rate for the next period (which controls the waiting time until the next transaction) is generated. Thus, the transaction rate that applies to the first transaction in a period j after time 0 is generated at time 0. Dynamic model (4) is an example of a type of Bayesian dynamic model. Conventional Bayesian dynamic models are described in M. West et al., "Bayesian Forecasting and Dynamic Models," Springer-Verlag, 1989.

Because the mean of $\epsilon_{k,j,i}$ one and its variance is $1/\alpha$, the transaction rate is more stable for larger $\alpha$. The current transaction rate is also more variable when the previous transaction rate was high than when it was low. To see this, let $C_{k,j,(i)}$ denote the cycle of the last transaction in period j prior to $T_{k,j,i}$, that is, $$C_{k,j,(i)} = \begin{cases} \max\{l<k: N_{l,j} \geq 1\}, & N_{k,j}(T_{k,j,i} - T_{k,j,0}) \leq 1 \\ k, & N_{k,j}(T_{k,j,i} - T_{k,j,0}) \geq 2, \end{cases}$$

where $N_{k,j}(T_{k,j,i} - T_{k,j,0})$ represents the number of transactions in period j of cycle k up to time $T_{k,j,i}$. By convention, $C_{k,j,(i)} = 0$ if no transactions occurred in period j prior to $T_{k,j,i}$. Let $\lambda_{k,j,(i)}$ denote the rate in effect at the time of the last transaction in period j of cycle $C_{k,j,(i)}$. It follows from dynamic model (4) that $(\lambda_{k,j,k}|\lambda_{k,j,(i)}) \sim \Gamma(\alpha, \alpha/\lambda_{k,j,(i)})$, which has variance $\lambda^2_{k,j,(i)}/\alpha$.

The posterior distribution of the current transaction rate can be found as follows. Let $W_{k,j,i}$ denote the time elapsed in period j between the last transaction in period j and time $T_{k,j,i,-1}$, so $$W_{k,j,i} = \begin{cases} \sum_{l=C_{k,j,(i)}}^{k-1} Y_{l,j,N_{l,j}+1}, & C_{k,j,(i)} < k \\ 0, & C_{k,j,(i)} = k, \end{cases}$$

with the convention that $Y_{k,j,1} = 0$. For $1<i \leq N_{k,j}$, the posterior distribution of $\lambda_{k,j,i}$ given the previous transaction rate $\lambda_{k,j,(i)}$ and all the observed data $Y_{k,j,1} = \{Y_{1,j,1}, \ldots, Y_{k,j,i}\}$ up to and including time $T_{k,j,i}$ is $\Gamma(\alpha+1, \alpha/\lambda_{k,j,(i)} + W_{k,j,i} + Y_{k,j,i})$ When $i = N_{k,j}+1$, the time $Y_{k,j,i}$ after the last transaction in a period until the end of the period is a censored exponential and the posterior distribution of $\lambda_{k,j,i}$ given $\lambda_{k,j,(i)}$ and the $Y_{k,j,i}$ is $\Gamma(\alpha, \alpha/\lambda_{k,j,(i)} + W_{k,j,i} + Y_{k,j,i})$. Thus, $$E(\lambda_{k,j,i} | \lambda_{k,j,(i)}, Y_{k,j,i}) = \begin{cases} [(1-w)\lambda^{-1}_{k,j,(i)} + w(W_{k,j,i} + Y_{k,j,i})]^{-1}, & 1 \leq i \leq N_{k,j} \\ \left[\lambda^{-1}_{k,j,(i)} + \frac{w}{1-w}(W_{k,j,i} + Y_{k,j,i})\right]^{-1}, & i = N_{k,j}+1, \end{cases}$$

where $w = (\alpha+1)^{-1}$. This posterior mean is not directly useful for the sequential estimation problem addressed in the illustrative embodiment because it depends on the unknown period rate $\lambda_{k,j,(i)}$ and all the past observations. It does, however, resemble the EDE given by equation (2) above.

Derivation of the EDE

Taylor expansions of an approximation to the posterior mean of a transaction rate $\lambda_{k,j,i}$ given the initial rate $\lambda_{j,0}$ and $Y_{k,j,i}$ can be used to derive an iterative procedure for updating $\lambda_{k,j,i}$. Namely, take $$\hat{\lambda}^{-1}_{k,j,i} = \begin{cases} (1-w)\hat{\lambda}^{-1}_{k,j,(i)} + w(W_{k,j,i} + Y_{k,j,i}), & k \geq 1, 1 \leq i \leq N_{k,j} \\ \hat{\lambda}^{-1}_{k,j,(i)} + \frac{w}{1-w}(W_{k,j,i} + Y_{k,j,i}), & k \geq 1, i = N_{k,j}+1, \end{cases}$$

where $\hat{\lambda}_{1,j,1} = E(\lambda_{1,j,0}|\lambda_{1,j,1})$. For k>1 or i>1, $\hat{\lambda}_{k,j,i}$ approximates the posterior mean $E(\lambda_{k,j,i}|\lambda_{j,0}, Y_{k,j,i})$. Because the transaction rates $\hat{\lambda}_{k,j,i}$ are updated at the end of each period j or at each new transaction in period j, the previous equations can be rewritten as $$\hat{\lambda}^{-1}_{k,j,i} = \begin{cases} (1-w)\hat{\lambda}^{-1}_{k,j,i-1} + wY_{k,j,i}, & k \geq 1, 1 \leq i \leq N_{k,j} \\ \hat{\lambda}^{-1}_{k,j,i-1} + \frac{w}{1-w}Y_{k,j,i}, & k \geq 1, i = N_{k,j}+1, \end{cases} \quad (5)$$

which uses only the previous estimate and the current transaction to update the estimators. The iterative estimators for the period probabilities are then $$\hat{\pi}_{k,j,i} = \hat{\lambda}_{k,j,i}\delta_j \Big/ \left(\sum_{m=1}^J \hat{\lambda}_{k,m,i}\delta_m\right).$$

The weight w in the iterative estimate may be selected as proportional to the variance of the multiplicative noise factor in the dynamic model (4): $w = \alpha(\alpha+1)^{-1}\text{var}(\epsilon_{k,j,i})$. If $\text{var}(\epsilon_{k,j,i})$ is large, then $\lambda_{k,j,i}$ evolves quickly and more weight must be given to the current observation $Y_{k,j,i}$, which leads to a noisier sequence of estimates $\{\hat{\lambda}_{k,j,i}\}$. Conversely, if $(\epsilon_{k,j,i})$ is small, then $\lambda_{k,j,i}$ evolves slowly and more weight should be given to previous waiting times, giving more stable $\{\hat{\lambda}_{k,j,i}\}$. The simulations to be described in detail below, however, suggest that larger w, on the order of $1/\sqrt{\alpha}$, may provide better performance.

The iterative estimate (5) is updated whenever there is a transaction in period j or a period j ends. This is referred to as full iterative estimation because each transaction rate is updated as soon as it changes or as soon as a period to which it applies ends. Thus, full iterative estimation requires updating the signature for each customer at the end of every period. Retrieving all signatures at the end of every period can be impractical, however. It will be shown below that the EDE, which is updated only when there is a transaction, is equivalent to the full iterative estimator (5) whenever there is a transaction. Although the EDE is out-of-date whenever no transaction occurs in a period, this limited staleness is not of major significance in many practical applications.

Now suppose the transaction rates can be updated only at the time of a transaction, and whenever there is a transaction the estimated transaction rates for all periods since the last transaction are updated. For example, suppose that J=3 and the current transaction falls in period 2 of cycle 10. If the previous transaction fell in period 2 of cycle 8, then $\lambda_{9,3,1}$ and $\lambda_{10,1,1}$ as well as $\lambda_{10,2,1}$ would be updated at time $T_{10,3,1}$. Note that missed periods are "found" only at the first transaction time in a period. Because updating occurs only at transaction times, the subscripts are by transaction number rather than by cycle and period. The transaction times are denoted by $T_1, \ldots, T_n$, their periods by $R_1, \ldots, R_n$, the time from the start of period $R_n$ to $T_n$ is $S_n$, and the transaction rates in effect at transaction n are $\lambda_{1,n}, \ldots, \lambda_{j,n}$.

Let $M_{j,n} \geq 0$ be the number of missed periods of type j between $T_{n-1}$ and $T_n$, i.e., the number of cycles during which the transaction rate for period j was not updated. In the example above, $M_{3,n}=M_{1,n}=2$ and $M_{2,n}=1$. Let $Z_{j,n}$ be the waiting time for period j at transaction n, so that $$Z_{j,n} = \begin{cases} T_n - T_{n-1} & R_n = R_{n-1} = j \text{ and } C_n = C_{n-1} \\ M_{j,n}\delta_j + S_n + \delta_j - S_{n-1}, & R_n = R_{n-1} = j \text{ and } C_n > C_{n-1} \\ M_{j,n}\delta_j + \delta_j - S_{n-1}, & R_{n-1} = j, R_n \neq j \\ M_{j,n}\delta_j + S_n, & R_{n-1} \neq j, R_n = j \\ M_{j,n}\delta_j & R_{n-1} \neq j, R_n \neq j. \end{cases}$$

Finally, define the updated EDE for period j at transaction n by $$\hat{\lambda}_{j,n}^{-1} = \begin{cases} (1-w)\hat{\lambda}_{j,n-1}^{-1} + wZ_{j,n}, & R_n = j \\ \hat{\lambda}_{j,n-1}^{-1} + \frac{w}{1-w}Z_{j,n}, & R_n \neq j \end{cases} \quad (6)$$

for j=1, ..., J.

With equation (6), all estimated transaction rates are brought up-to-date at each transaction time, but some estimated rates may be out-of-date between transactions because inactive periods have not yet been accounted for. The reciprocal of the updated rate for period j is a weighted average of the previous estimated reciprocal rate for period j and the time $Z_{n,j}$ spent in period j since the last transaction when the current transaction falls in period j. If the current transaction does not fall in period j, then the updated reciprocal rate for period j is not a weighted average. Instead, the previous estimate is increased by a term that is proportional to the time in period j with no activity.

Because all transaction rates are brought up-to-date at the time of a transaction, regardless of which period the transaction falls in, the EDE of the period probability for period j is $$\hat{\pi}_{j,n} = \frac{\hat{\lambda}_{j,n}\delta_j}{\sum_{i=1}^{J}\hat{\lambda}_{i,n}\delta_i}. \quad (7)$$

A case-by-case analysis shows that at time $T_n$ the JEDEs from equation (6) are identical to the J iterative estimates from equation (5). For example, suppose that $R_n=j$, $R_{n-1}=i \neq j$ and $M_{j,n}>0$. Then the transaction at time $T_n$ is the first in period j of cycle $C_n$. With the full iterative estimator, the estimated reciprocal transaction rate for period j would have been updated by a censored exponential of length $\delta_j$ at the end of each of the previous $M_{j,n}$ intervals of type j. Therefore, just before time $T_n$, the full iterative estimator would be the reciprocal of $$\hat{\lambda}_{j,n-1}^{-1} + \frac{w}{1-w}M_{j,n}\delta_j.$$

At time $T_n$, this estimator would be updated to $$(1-w)\left(\hat{\lambda}_{j,n-1}^{-1} + \frac{w}{1-w}M_{j,n}\delta_j\right) + wS_n = (1-w)\hat{\lambda}_{j,n-1}^{-1} + wZ_{j,n},$$

which is identical to the reciprocal of the EDE after transaction n.

The EDE (6) is computed from the current estimated rate $\hat{\lambda}_{j,n}$ and the time $T_{n-1}$ of the last transaction. This is almost as memory-efficient as the conventional EWMA estimate (1), which requires storing only the first J−1 of the $\hat{\pi}_j$'s.

An Application: Estimating Day-of-Week Calling Patterns for Fraud Detection

Simply stated, fraud detection is the discrimination of legitimate transactions from fraudulent ones. Because customers are often extremely diverse, the discrimination generally must be tailored to each customer separately. An important step in fraud detection, then, is tracking the legitimate behavior of each customer in real-time, so that there is an accurate basis of comparison for discriminating fraud. The section describes an example application of the present invention which involves tracking day-of-week calling patterns for a random sample of about 2,000 callers who made between 50 and 800 completed calls during peak hours over a three month period. Peak hours are defined in this example to be 9:00 a.m. to 11:00 a.m. and 1:00 p.m. to 4:00 p.m. Monday through Friday. Not all customers made calls for the entire three months; the time between a customer's first and last calls ranged from eight to thirteen weeks.

The above-described dynamic Poisson model holds for a customer if the times $Y_{k,j,i}$ between calls i and i−1 during peak hours on day-of-week j in week k behave as independent exponential($\lambda_{k,j,i}$) random variables. The day-of-week calling patterns for non-peak calls may be different. To avoid the complications of nesting hours-within-days, the non-peak calls are ignored in this example. The calling rates $\lambda_{k,j,i}$ for the customer are unknown and might change throughout the three months, but this example will initially be used to test the simple Poisson model for customer transaction rates that are approximately constant over the three month period, so $Y_{k,j,i}$~exponential ($\lambda_j$).

A chi-squared goodness-of-fit test for the exponential distribution can be applied to the waiting times for each day of week for each customer separately, giving a total of 10,000 goodness-of-fit p-values. This type of test is described in greater detail in W. J. Conover, "Practical Nonparametrix Statistics," John Wiley & Sons, New York, 1980. Under the null hypothesis that the Poisson timing model is adequate, the sep-values are uniformly distributed in the interval (0,1). If the simple Poisson timing model with constant transaction rates is adequate for this set of customers, then the points when plotted should lie on a straight line. Taking an intercept from a regression of theoretical U(0,1) quantiles on the empirical quantiles as an estimate oft he fraction of customers for whom the constant rate Poisson model is inadequate shows that the simple model does not fit for only about 5.5% to 7.5% of customers across weekdays. This degree of lack-of-fit may be acceptable in the present example and in many other practical applications.

Even if the simple Poisson model with constant rates does not fit, the EDEs of the day-of-week probabilities may still be adequate. To check if that is the case here, the empirical distribution $\pi$ of a customer's calls per weekday may be taken over the three month period as the underlying day-of-week distribution for the customer. The average absolute relative error of the EDE $\hat{\pi}_n$ with respect to $\pi$ is then computed as a function of call number by taking $$\varepsilon_n = 100 \sum_{j=1}^{5} \frac{|\pi_j - \hat{\pi}_{j,n}|}{5\pi_j}.$$

Percentiles of the average error at call n over all customers that make at least n calls then describe the performance of the EDE. It has been determined in the present example that, considering the entire sample of customers as a whole, the EDE clearly outperforms the EWMA estimate. After about 100 calls, the median EDE average absolute relative error is smaller than the 0.25 quantile of the EWMA average absolute relative error; after 300 calls, the 0.75 EDE quantile is smaller than the 0.25 EWMA quantile. The median average absolute relative error stabilizes around 5% for the EDE and around 15% for the EWMA. As expected, the average absolute relative errors for the subset of customers for which the constant rate Poisson model is inadequate tend to be larger than those for all 2,000 customers considered as one group, but the EDE still clearly dominates the EWMA. The median average absolute relative error curve oscillates around 8% for the EDE and around 22% for the EWMA. In this application, then, the EDE is relatively robust to departures from the constant rate Poisson timing model.

Approximate Behavior of the EDE

The approximate behavior of the EDE will now be described in greater detail. The approximate conditional moment will be described first, followed by the approximate conditional distribution under a Poisson model with constant transaction rates.

Equation (6) is convenient for updating the rate estimates, but not for establishing their properties. For that, it is more convenient to rewrite the EDE as a sum of terms that are defined at the transactions that fall in period j, plus an additional term that reflects the inactive time spent in period j, if the current period is unequal to j. To simplify the notation, subscript j is suppressed in this section.

Let $N_{+,i}$ denote the number of transactions that fall in period j up to and including time $T_i$ and $N_{-,i}$ denote the number of transactions in period j up to but not including time $T_i$, so $$N_{+,i} = \sum_{m=1}^{i} I(R_m = j) \text{ and } N_{-,i} = N_{+,i} - I(R_i = j),$$

where $I(A)=1$ if condition A is true and 0 otherwise. Let $L_i$ be the index of the $i^{th}$ transaction in period j, so $L_i=\min\{m:N_{+,m}=i\}$, with the convention that $L_0=0$. Note that $L_i$ is only defined for $i=0, \ldots, N_{+,n}$ at transaction n. Finally, let $W_{+,i}$ be the total time spent in period j between time $T_i$ and the previous transaction in a period j (or since time 0, if there are no previous transactions in period j). Then $$W_{+,i} = \sum_{m=L_{N_{-,j}}+1}^{i} Z_{j,m}.$$

In particular, $W_{+,L_1}, \ldots, W_{+,L_{N_{+,n}}}$ are the waiting times between transactions that fall in period j up to time $T_n$.

Equation (6) shows that when the current transaction does not fall in period j, the reciprocal of the EDE is increased by a constant multiple of the inactive time since the last transaction. Averaging occurs only when there is a transaction in period j. It is thus possible to accumulate the inactive time and update the transaction rate for period j only at the time of a transaction in period j, Thus, the EDE can be rewritten as $$\hat{\lambda}_{j,n}^{-1} = \begin{cases} (1-w)\hat{\lambda}_{j,L_{N_{-,n}}}^{-1} + wW_{+,n}, & R_n = j \\ \hat{\lambda}_{j,L_{N_{-,n}}}^{-1} + \frac{w}{1-w}W_{+,n}, & R_n \neq j. \end{cases}$$

Since $\hat{\lambda}_{j,L_i}^{-1} = (1-W)\hat{\lambda}_{j,L_{i-1}} + wW_{+,L_i}$ (with $\hat{\lambda}_{j,L_0} = \lambda_{j,0}$), it follows that $$\hat{\lambda}_{j,n}^{-1} = \begin{cases} \sum_{i=1}^{N_{+,n}} (1-w)^{i-1} wW_{+,L_i} + (1-w)^{N_{-,n}} \lambda_{j,0}^{-1}, & R_n = j \\ \sum_{i=1}^{N_{+,n}} (1-w)^{i-1} wW_{+,L_i} + (1-w)^{N_{+,n}} \lambda_{j,0}^{-1} + \frac{w}{1-w} W_{+,n}, & R_n \neq j. \end{cases} \quad (8)$$

To summarize, the rate estimates obtained by (i) updating at every transaction in period j and at the end of every period j, or (ii) updating at the time of each transaction, regardless of which period it falls in, but not at the end of each period j, or (iii) updating only when there is a transaction in period j are identical at the time of a transaction in period j. Updating scheme (ii) is most useful for computing, but (iii) is most useful for establishing properties of the rate estimator.

Approximations to the moments and the distribution of $\hat{\lambda}_{j,n}$ will now be described. The main interest here is to understand the forecasting properties of $\hat{\lambda}_{j,n}$ given a sequence of transaction rates $\lambda_{j,n} = \{\lambda_{j,1}, \ldots, \lambda_{j,N_{+,n}}\}$ and $N_{+,n}$. To simplify the notation, the dependence on the conditioning variables is suppressed, but all moments and densities should be understood as conditional on $\lambda_{j,n}$ and $N_{+,n}$. For example, $E(\hat{\lambda}_{j,n}^{-1})$ denotes $E(\hat{\lambda}_{j,n}^{-1} | \lambda_{j,n}, N_{+,n})$.

Given $\lambda_{j,n}$, it can be shown that the waiting times $W_{+,L_i}$, $i=1, \ldots, N_{+,n}$, between transactions in period j are independent exponential $(\lambda_{j,L_i})$ random variables under the dynamic Poisson timing model. The only other waiting time that needs to be considered is $W_{+,n}$ when $R_n \neq j$, where $$W_{+,n} = \delta_j - S_{L_{N_{+,n}}} + \delta_j \sum_{m=L_{N_{+,n}}+1}^{n} M_{j,m}.$$

Conditional $\lambda_{j,n}$ and $N_{+,n}$, the last sum has a geometric $(1-\exp(-\lambda_{j,L_{N_{+,n+1}}} \delta_j))$ distribution and is independent of $S_{L_{N_{+,n}}}$. If the transaction rate for period j changes so slowly that it is approximately constant within cycles, then $\delta_j - S_{L_{N_{+,n}}}$ is approximately distributed as a truncated exponential $(\lambda_{j,L_{N_{+,n+1}}})$ in the interval $[0, \delta_j]$. Combining these results implies that $W_{+,n}$ given $\lambda_{j,n}$ and $N_{+,n}$ is approximately $(\lambda_{j,L_{N_{+,n+1}}})$ when $R_n \neq j$.

When $R_n = j$, it follows from (8) that, given $\lambda_{j,n}$ and $N_{+,n}$, $$E(\hat{\lambda}_{j,n}^{-1}) = \sum_{i=1}^{N_{+,n}} (1-w)^{i-1} w\lambda_{j,L_i}^{-1} + (1-w)^{N_{+,n}} \lambda_{j,0}^{-1} \quad (9)$$

$$\text{var}(\hat{\lambda}_{j,n}^{-1}) = \sum_{i=1}^{N_{+,n}} (1-w)^{2(i-1)} w^2 \lambda_{j,L_i}^{-2}.$$

Similarly, when $R_n \neq j$, $$E(\hat{\lambda}_{j,n}^{-1}) \cong \sum_{i=1}^{N_{+,n}} (1-w)^{i-1} w \lambda_{j,L_i}^{-1} + (1-w)^{N_{+,n}} \lambda_{j,0}^{-1} + \frac{w}{1-w} \lambda_{J,L_{iN_{+,n}-1}}^{-1} \quad (10)$$

$$\text{var}(\hat{\lambda}_{j,n}^{-1}) \cong \sum_{i=1}^{N_{+,n}} (1-w)^{2(i-1)} w^2 \lambda_{j,L_i}^{-2} + \left(\frac{w}{1-w}\right)^2 \lambda_{J,N_{+,n}+1}^{-2}.$$

If $\lambda_{j,n} = \lambda_j$ for all n, then for $R_n = j$ $$E(\hat{\lambda}_{j,n}^{-1}) = [1-(1-w)^{N_{+,n}}]\lambda_j^{-1} + (1-w)^{N_{+,n}} \lambda_{j,0}^{-1} \xrightarrow{N_{+,n} \to \infty} \lambda_j^{-1} \quad (11)$$

$$\text{var}(\hat{\lambda}_{j,n}^{-1}) = \frac{w}{2-w}[1-(1-w)^{2N_{+,n}}]\lambda_j^{-2} \xrightarrow{N_{+,n} \to \infty} \frac{w}{2-w}\lambda_j^{-2}.$$

When $R_n \neq j$, the approximations in (10), become exact and simplify to $$E(\hat{\lambda}_{j,n}^{-1}) = \frac{1}{1-w}[1-(1-w)^{N_{+,n}+1}]\lambda_j^{-1} + (1-w)^{N_{+,n}} \lambda_{j,0}^{-1} \xrightarrow{N_{+,n} \to \infty} \frac{1}{1-w}\lambda_j^{-1} \quad (12)$$

$$\text{var}(\hat{\lambda}_{j,n}^{-1}) = \frac{w}{(2-w)(1-w)^2}[1-(1-w)^{2(N_{-,n}+1)}]\lambda_j^{-2} \xrightarrow{N_{+,n} \to \infty} \left[\frac{w}{(2-w)(1-w)^2}\right]\lambda_j^{-2}.$$

The approximate conditional distribution under a Poisson model with constant rates will now be described. If the transaction rate for period j is constant across cycles, then, given $\lambda_{j,n}$ and $N_{+,n}$, the EDE of a reciprocal rate is a linear combination of independent, identically distributed exponential random variables, plus an exponentially decreasing term that depends on $\lambda_{j,0}$. If all coefficients in the linear combination were the same, the linear combination would be conditionally distributed as a gamma random variable. The conditional distribution of $\hat{\lambda}_{j,n}^{-1}$ can therefore be approximated by an exponentially decreasing constant plus a gamma distribution with parameters that match the first two moments of $\hat{\lambda}_{j,n}^{-1}$. That is, $$\hat{\lambda}_{j,n}^{-1} \approx \Gamma\left(\frac{[E(\hat{\lambda}_{j,n}^{-1}) - (1-w)^{N_{+,n}} \lambda_{j,0}^{-1}]^2}{\text{var}(\hat{\lambda}_{j,n}^{-1})}, \frac{[E(\hat{\lambda}_{j,n}^{-1}) - (1-w)^{N_{+,n}} \lambda_{j,0}^{-1}]}{\text{var}(\hat{\lambda}_{j,n}^{-1})}\right) + (1-w)^{N_{+,n}} \lambda_{j,0}^{-1}.$$

From equations (11) and (12), $$\hat{\lambda}_{j,n}^{-1} \approx (1-w)^{N_{+,n}} \lambda_{j,0}^{-1} + \quad (13)$$

$$\begin{cases} \Gamma\left(\frac{\left(\frac{2-w}{w}[1-(1-w)^{N_{+,n}}]\right)^2}{1-(1-w)^{2N_{+,n}}}, \frac{2-w}{w}\frac{1-(1-w)^{N_{+,n}}}{1-(1-w)^{2N_{+,n}}}\lambda_j\right), & R_n = j \\ \Gamma\left(\frac{\left(\frac{2-w}{w}[1-(1-w)^{N_{+,n}+1}]\right)^2}{1-(1-w)^{2(N_{+,n}+1)}}, \frac{(2-w)(1-w)}{w}\frac{1-(1-w)^{N_{+,n}+1}}{1-(1-w)^{2(N_{+,n}+1)}}\lambda_j\right), & R_n \neq j \end{cases}$$

Letting $N_{+,n} \to \infty$, the right side of (13) asymptotically simplifies to $$\hat{\lambda}_{j,n}^{-1} \approx \begin{cases} \Gamma\left(\frac{2-w}{w}, \frac{2-w}{w}\lambda_j\right), & R_n = j \\ \Gamma\left(\frac{2-w}{w}, \frac{(2-w)(1-w)}{w}\lambda_j\right), & R_n \neq j. \end{cases} \quad (14)$$

Simulations indicate that the approximation (13) provides good performance for a wide range of w, even for small $N_{+,n}$. It is sufficient to simulate the behavior of $\hat{\lambda}_{j,n}$ at $\lambda_j$ under the Poisson timing model because, with constant rates, the distribution of $$\lambda_j \sum_{i=1}^{N_{+,n}} (1-w)^{i-1} w W_{+,L_i}$$

in equation (8) is free of $\lambda_j$ and the contribution of the initial rate $\lambda_{j,0}$ decreases exponentially. Using the statistical language S described in R. A. Becker et al., "The New S Language: A Programming Environment for Data Analysis and Graphics," Wadsworth, Belmont, Calif., 1988, 2500 simulated values of $\hat{\lambda}_{j,n}^{-1} - (1-w)^{N_{+,n}} \lambda_{j,0}^{-1}$ were generated, with $w=0.02$, $N_{+,n}=10$, for both $R_n=j$ and $R_n \neq j$, and the empirical distribution of the 2500 values of $\lambda_j[\hat{\lambda}_{j,n}^{-1} - (1-w)^{N_{+,n}} \lambda_{j,0}^{-1}]$ were compared with the gamma approximation. The comparison indicated that the empirical cumulative distribution function (CDF) is close to the approximate gamma CDF. Similar results were obtained for other values of w and $N_{+,n}$.

The approximate distribution of $\lambda_j[\hat{\alpha}_{j,n}^{-1} - (1-w)^{N_{+,n}} \lambda_{j,0}^{-1}]$ can be used as a pivot to construct approximate conditional prediction intervals for the transaction rates. Let $\gamma_{j,n}(\alpha,w)$ denote the $100\alpha^{th}$ percentile of the gamma approximation

(13) for $\hat{\lambda}_{j,n}^{-1}$ with $\lambda_j=1$. Then an approximate conditional prediction interval of level 1−α for $\lambda_p$ based on $\hat{\lambda}_{j,n}^{-1}$ is $$\left[\frac{\gamma_{j,n}(\alpha/2, w)}{\hat{\lambda}_{j,n}^{-1} - (1-w)^{N+n}\lambda_{j,0}^{-1}}, \frac{\gamma_{j,n}(1-\alpha/2, w)}{\hat{\lambda}_{j,n}^{-1} - (1-w)^{N+n}\lambda_{j,0}^{-1}}\right].$$

For large $N_{+,n}$, similar intervals can be obtained using (14).

Approximate conditional moments for the estimated period probabilities $\hat{\pi}_{j,n}$ can be obtained from equations (9) and (10) (or equations (11) and (12)) by applying the delta method to equation (7). The delta method is described in B. Efron et al., "An Introduction to the Bootstrap," Chapman & Hall, New York, 1993. When transaction rates are constant across cycles, better approximate prediction intervals for period probabilities can be obtained from a parametric bootstrap using the approximate distributions (13) or (14) and the independence of the transaction rate estimators.

In practice, transaction rates tend to vary slowly with time, reflecting changes in the environment and the individual, so the assumption of constant transaction rates across cycles may be reasonable for only a limited number of cycles. The approximations continue to hold locally, but $N_{+,n}$ needs to be redefined as the number of transactions during period j for the past max (0, $C_n$−k) where k is the number of cycles over which λj,n is nearly constant.

Finite Sample Performance of the EDE

Simulations were used to compare the performance of the above-described EDE having example updating weights of w=0.02, 0.05, and 0.1 with the performance of the conventional MLE for different Poisson timing models. In each simulation, there are 12 cycles (or weeks) of 7 periods (or days), and each period has the same transaction rate. Thus, the period probabilities are all 1/7. In the following description, a simulation based on the Poisson timing model with constant period is described first, followed by a simulation based on the dynamic Poisson timing model. Finally, a simulation based on a Poisson timing model with a deterministic shift in the period rates at the end of the 12th cycle is described. In the latter simulation, at the end of the 12th cycle, one period rate is increased by 25%, another decreased by 25%, and the rates for the other periods are unchanged. All period rates then remain constant for another 12 cycles.

The performance of the estimators changes with time, as more transactions are made and, under the dynamic model or shift model, as the underlying transaction rates change. If θ(t) is a parameter of interest (a rate or a period probability) at time t and $\hat{\theta}(t)$ its estimate, then the absolute relative error at time t may be defined as $\epsilon[\hat{\theta}(t)] = 100E(|\hat{\theta}(t)-\theta(t)|)/\theta(t).$ For each of the simulations noted above, 10,000 paths of the transaction process were simulated under the corresponding Poisson timing model, each path covering 12 cycles. For each simulated path, period rates and probabilities were estimated at each transaction and the corresponding absolute relative errors were evaluated on a fixed, equally spaced grid of 100 time points, using linear interpolation. This allows the absolute relative error curves from different transaction paths to be combined. Additional information presented includes the mean of the 10,000 absolute relative error curves, and the standard deviations of the mean absolute relative error curves. The latter provides an assessment of the precision in the simulation results.

For the Poisson model with constant rates, four scenarios, with identical transaction rates λ fixed at constant values of 1, 5, 10, or 20 for each of seven periods, giving period probabilities of 1/7 for each period, were simulated. Estimated transaction rates for each period were initialized for each of the seven periods independently by randomly selecting a value in the interval [0.75λ, 1.25λ] according to a uniform distribution. This initialization procedure implies that, on average, the transaction rates are initialized at the correct value, but the initial rate for any period can be off by as much as 25%. In practice, initial transaction rates are generally derived from past customer data, so initial rates averaged over customers tend to be unbiased. Therefore, the simulated initialization procedure is realistic.

Figure 6:
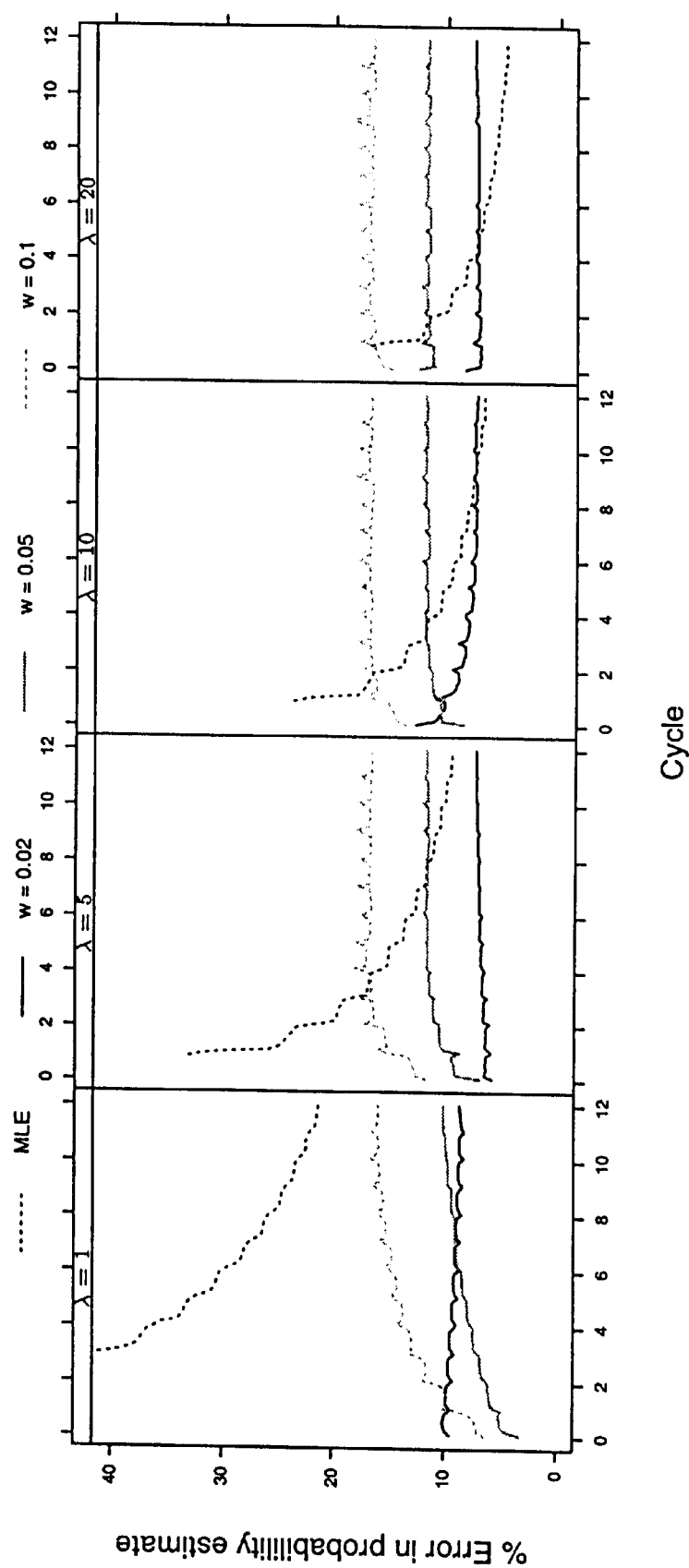
FIG. 6 shows absolute relative error curves for first period probability for a conventional MLE and a number of example EDEs in accordance with the invention, for a Poisson timing model with constant rates that are fixed for all periods.

FIG. 6 shows the absolute relative error curves for the MLE and the EDE, and FIG. 7 lists the corresponding standard deviations, for the simulation of the constant rate Poisson timing model. Each panel of FIG. 6 corresponds to a different base transaction rate. The standard deviations values listed in FIG. 7 are average values determined over the above-noted time grid, with the associated ranges given in parentheses following the average values.

The results shown in FIGS. 6 and 7 for the simulation for the constant rate Poisson timing model indicate the following:

1. The simulated absolute relative error of the MLE for the constant rate Poisson timing model decreases as the number of transactions increases.
2. The smallest updating weight, w=0.02 in this example, gives the best EDE under the constant rate model. During the first 12 cycles, the EDE with w=0.02 is better than the MLE for λ=1 and λ=5; better or equivalent to the MLE for λ=10; and worse than the MLE for λ=20, after 4 cycles.
3. The EDE with any of the three weights is better than the MLE during the initial cycles, even though the initial value assigned to λ is only correct on average. In contrast, the MLEs for the period probabilities are undefined until the first transaction in the last period of the first cycle is observed or the first cycle ends.
4. The absolute relative error rates for the EDE appear to stabilize at a value that does not depend on λ.

Figure 8:
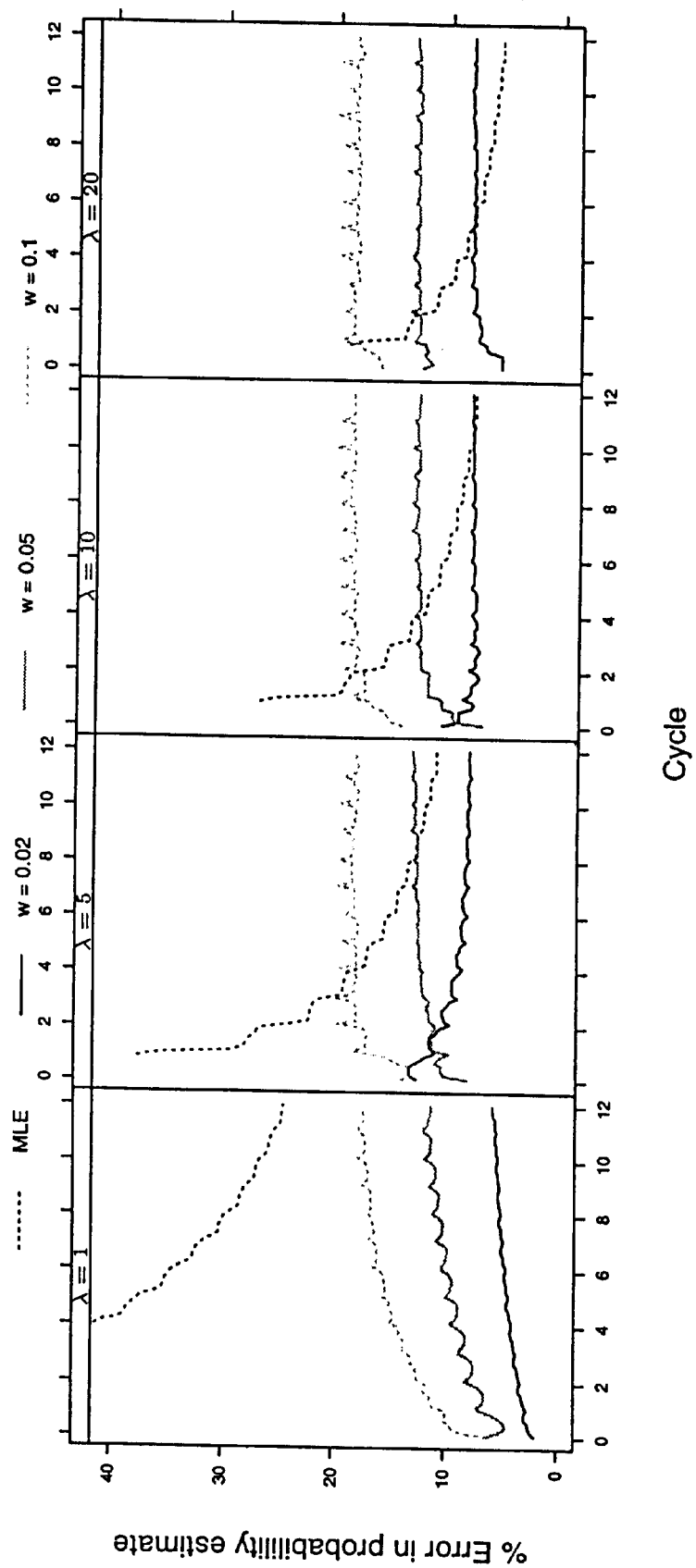
FIG. 8 shows absolute relative error curves for first period probability for a conventional MLE and a number of example EDEs in accordance with the invention, for a Poisson timing model with constant rates which vary across periods.

These conclusions remain valid when the transaction rates for each period are constant across cycles, but are different among periods. FIG. 8 shows the simulated absolute relative error curves for the estimated probability of period 1 under the same scenarios used to produce the results in FIG. 6, but with the period transaction rates $\lambda_1, \ldots, \lambda_7$ set to $\lambda_1=0.8\lambda$, $\lambda_2=\lambda$, $\lambda_3=1.2\lambda$, $\lambda_4=0.5\lambda$, $\lambda_5=3\lambda$, $\lambda_6=2\lambda$, and $\lambda_7=0.5\lambda$. As before, the base transaction rates are λ=1, 5, 10, and 20, and each panel of the figure corresponds to a different base transaction rate. The absolute relative error curves shown in FIG. 8 are nearly identical to those in FIG. 6, and the corresponding simulation standard deviations (not shown) are nearly identical to those listed in FIG. 7.

For the dynamic Poisson timing model, four scenarios with initial transaction rates of $\lambda_0=1$, 5, 10, and 20 transactions per period are considered. The EDE is initialized as in the constant rate model simulation previously described. The multiplicative noise term responsible for the evolution of the transaction rates in the dynamic Poisson model is simulated from a Γ(α, α) distribution with large α (α≧400), which means that the transaction rates evolve slowly. For large α, Γ(α, α)≈N(1, 1/α), so the endpoints of a 99% prediction interval for the relative change are approximately ±2.58/√α. The endpoints of the approximate 99% prediction intervals for the values of α used in the simulation corresponding to high (α=400), moderate (α=1600), and low (α=4000) noise levels are ±0.129, ±0.064, and ±0.041, respectively.

Figure 9:
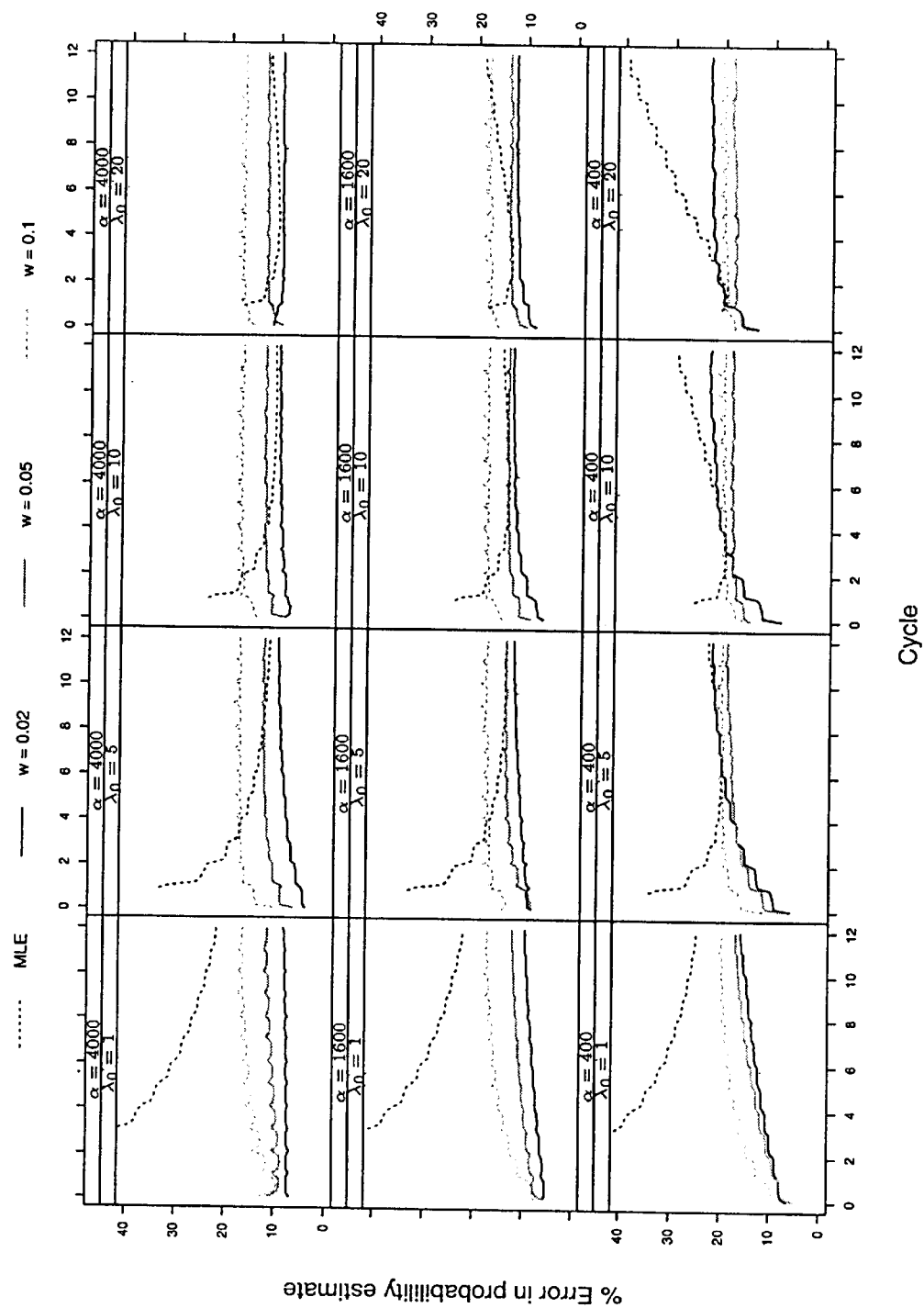
FIG. 9 shows absolute relative error curves for first period probability for a conventional MLE and a number of example EDEs in accordance with the invention, for a dynamic Poisson timing model.

FIG. 9 shows the absolute relative error rate curves for the first period (j=1) probability for MLE and the EDE with weights w=0.02, 0.05, and 0.1 over 12 cycles of the dynamic Poisson timing model, for each combination of the example $\lambda_0$ and α values. Each panel of the figure corresponds to a different initial transaction rate $\lambda_0$, which is the same for all periods, and a different noise parameter α. FIG. 10 lists the standard deviations for the absolute relative error curves with α=400, corresponding to the highest relative change in the transaction rates. Again, the standard deviation values are averaged over the time grid, with the ranges of the standard deviations over the time grid included in parentheses. The standard deviations for the absolute relative error curves corresponding to α=1600 and α=4000 fall between the values shown in FIG. 7 and those shown in FIG. 10. The results shown in FIGS. 9 and 10 for the simulation for the dynamic Poisson timing model indicate the following:

1. When α=400 (high noise), the EDE performs better than the MLE. The absolute relative errors for the EDE stabilize around 20%, independent of $\lambda_0$, but the absolute relative error for the MLE appears to increase with time. The EDE with w=0.05 is best, but the other values of w are nearly as good.
2. When α=1600 (moderate noise), the EDE with w=0.02 and the EDE with w=0.05 have similar absolute relative error curves, but the other estimators have larger absolute relative errors. The absolute relative error for the MLE increases over time for $\lambda_0$=20.
3. When α=4000 (low noise), the EDE with w=0.02 has the best absolute relative error curve. The MLE has a similar absolute relative error curve (flat around 10%) for $\lambda_0$=10 and $\lambda_0$=20.

The simulation results for the Poisson model with deterministic shifts in rates will now be described. Under this scenario, the period rates for the Poisson timing model are identical and constant for the first 12 cycles. As previously noted, at the end of the 12th cycle, the first period rate is increased by 25% and the rate for the fourth period is decreased by 25%, so the cycle rate remains the same. The period rates then stay constant for the next 12 cycles. The rates used for the first 12 cycles are $\lambda$=1, 5, 10, and 20 transactions per period. Each EDE is initialized using the procedure used above for the constant rate model.

Figure 11:
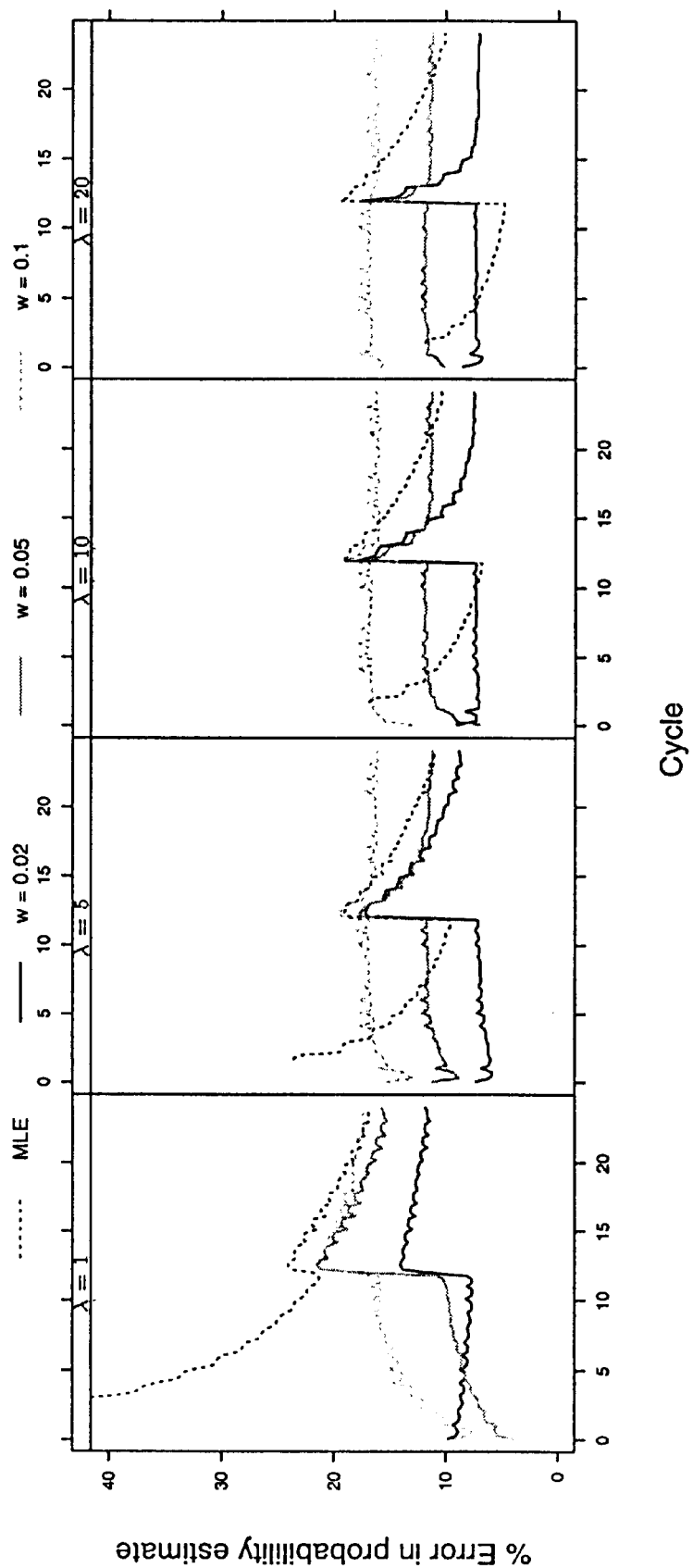
FIG. 11 shows absolute relative error curves for first period probability for a conventional MLE and a number of example EDEs in accordance with the invention, for a Poisson timing model with deterministic shifts in the period rates.
Figure 1:
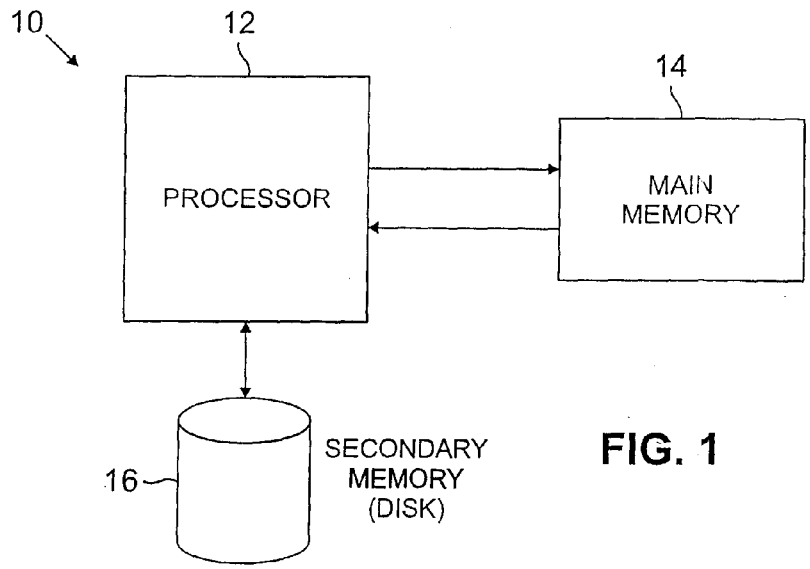
Figure 2:
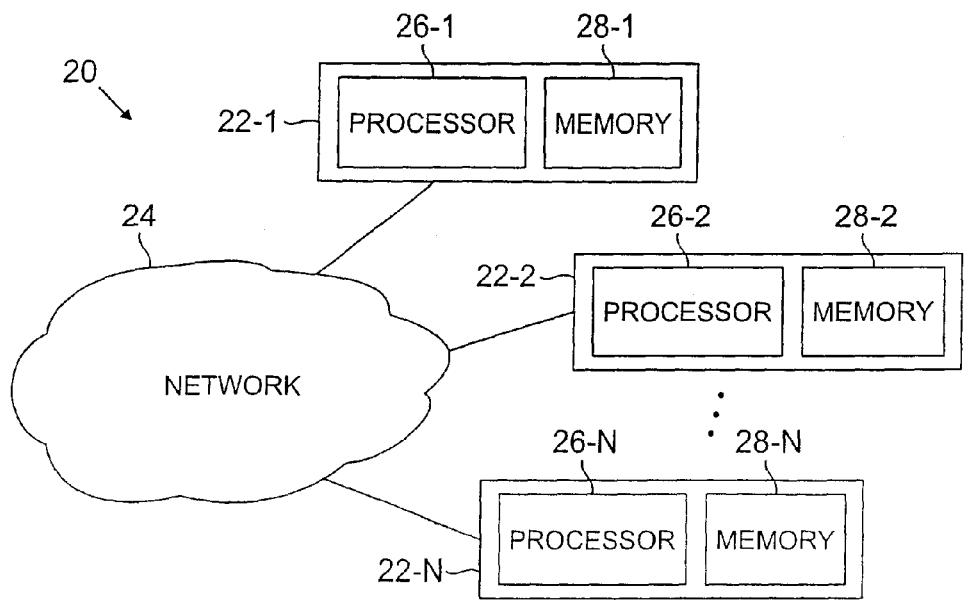
Figure 3:
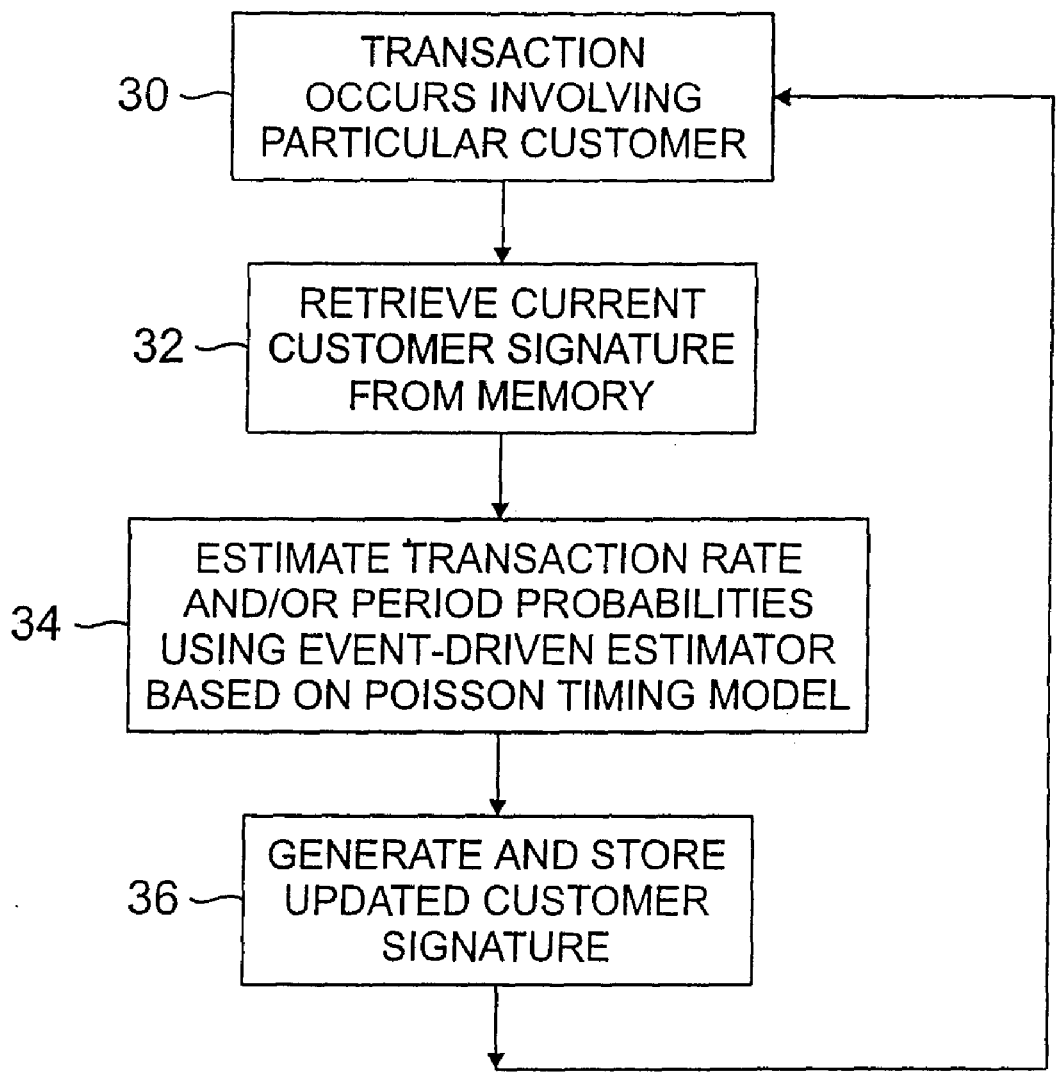
Figure 4:
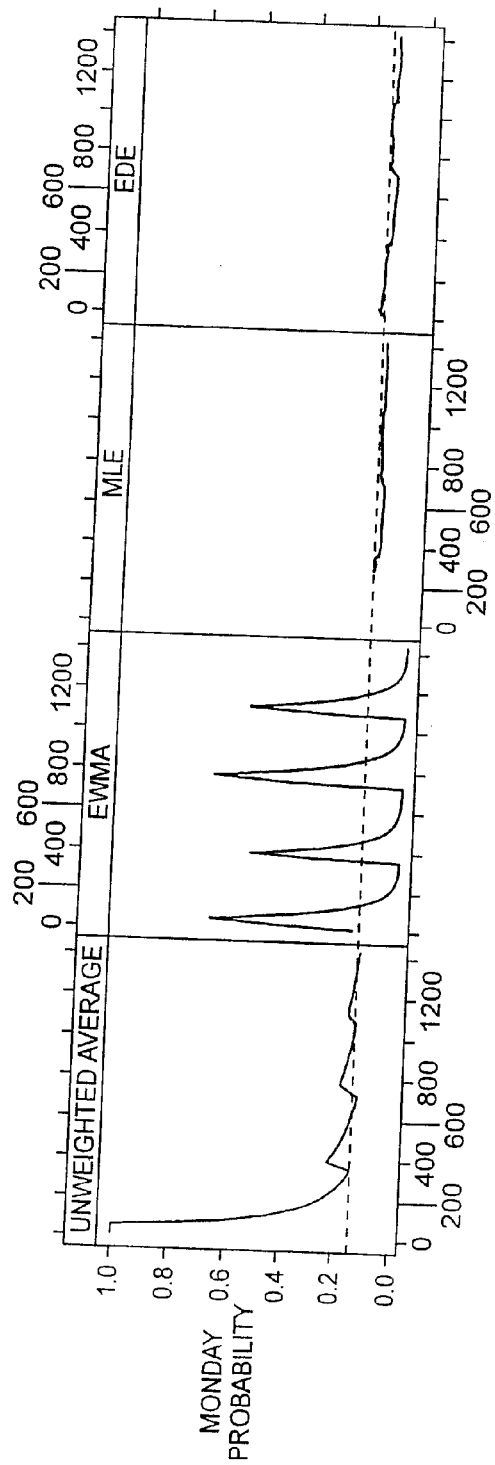
Figure 5:
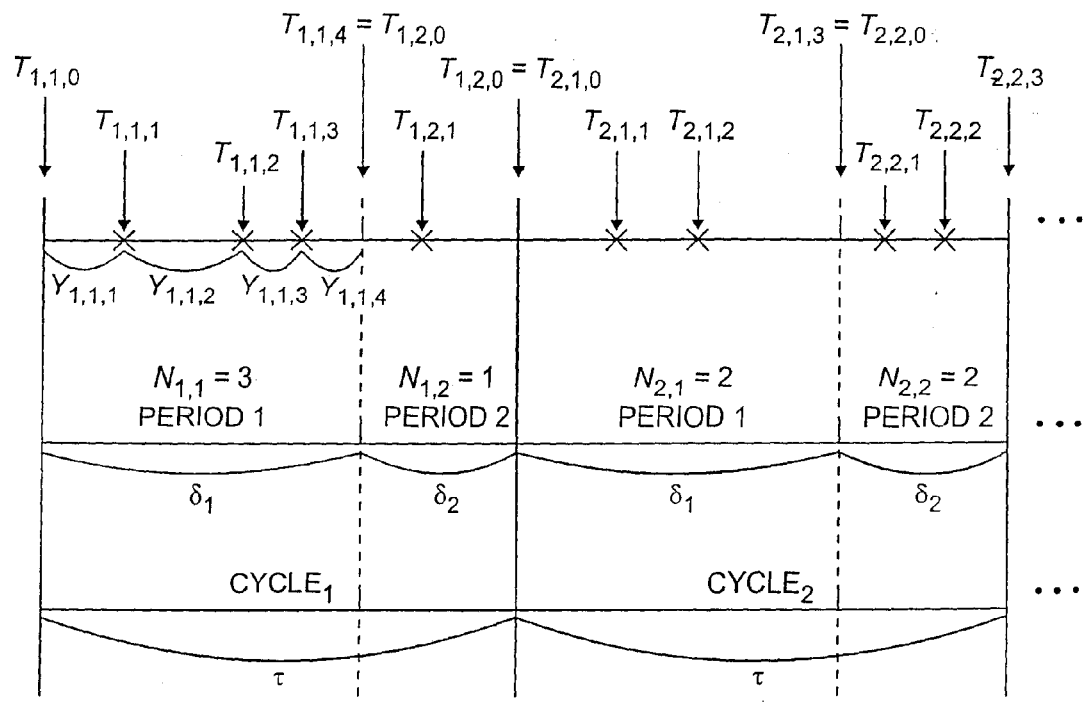
Figure 6:
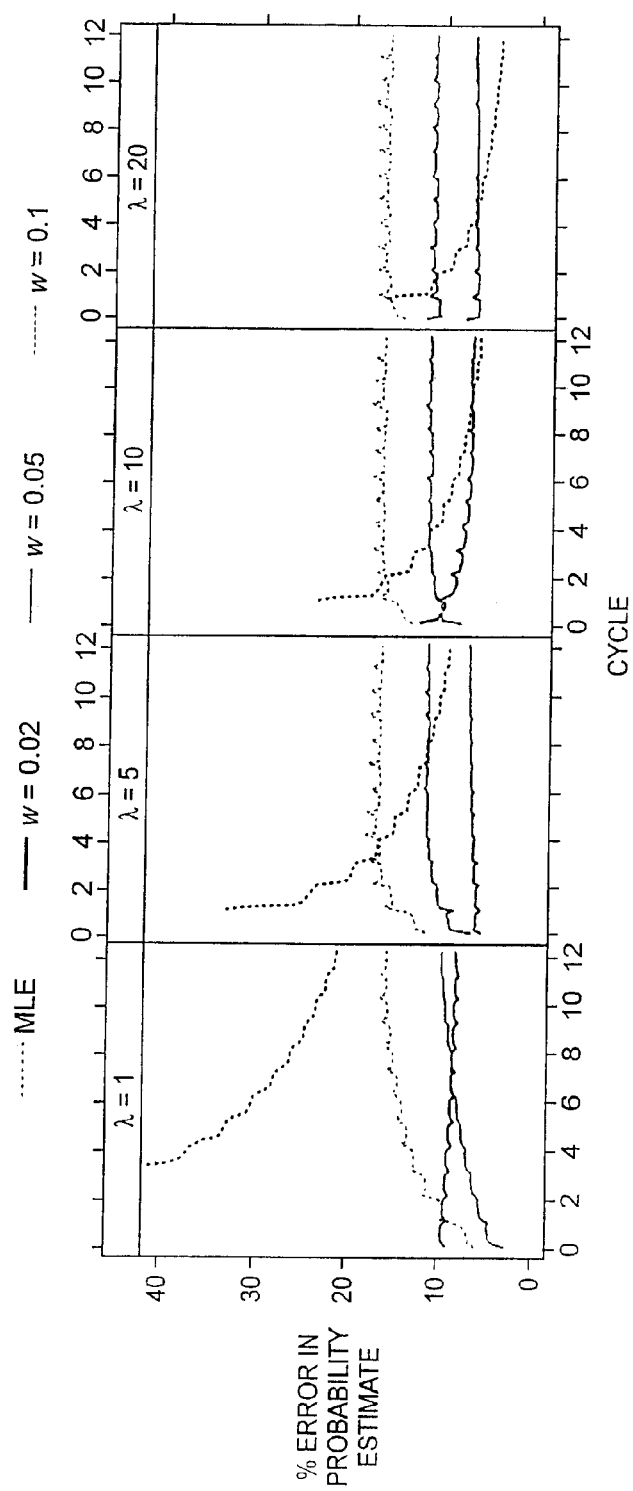
Figure 8:
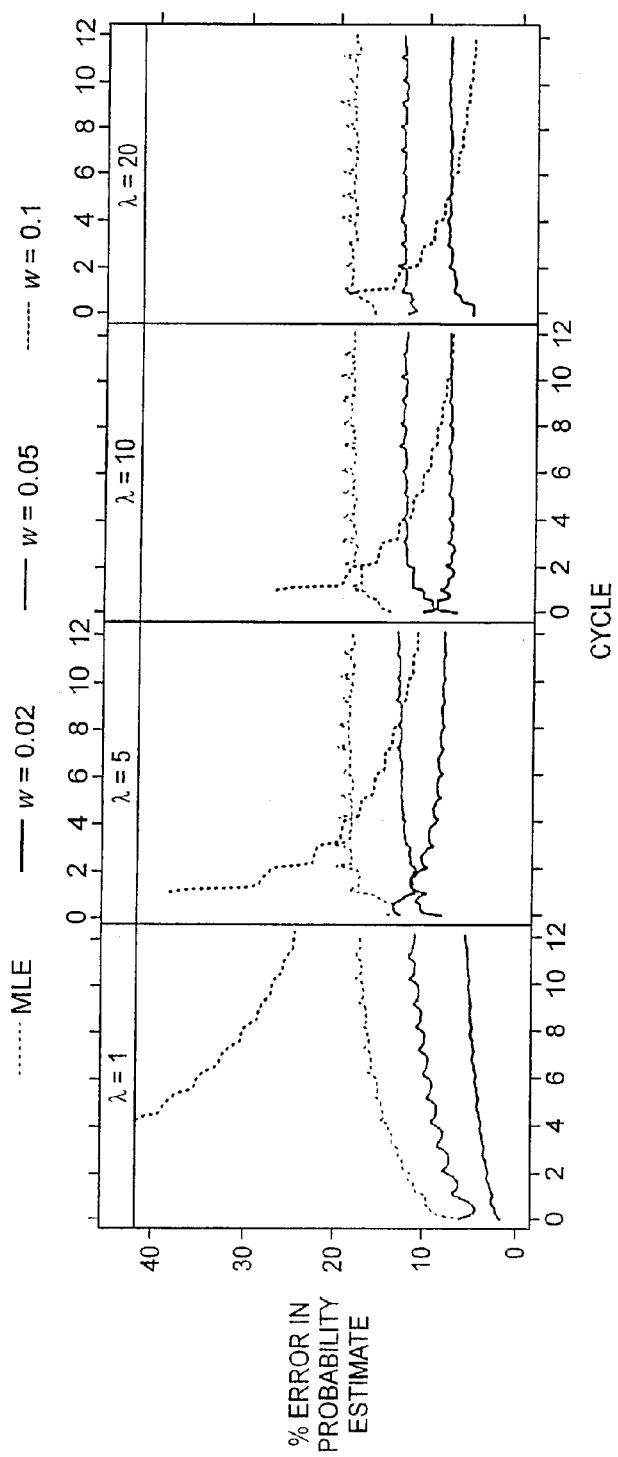
Figure 9:
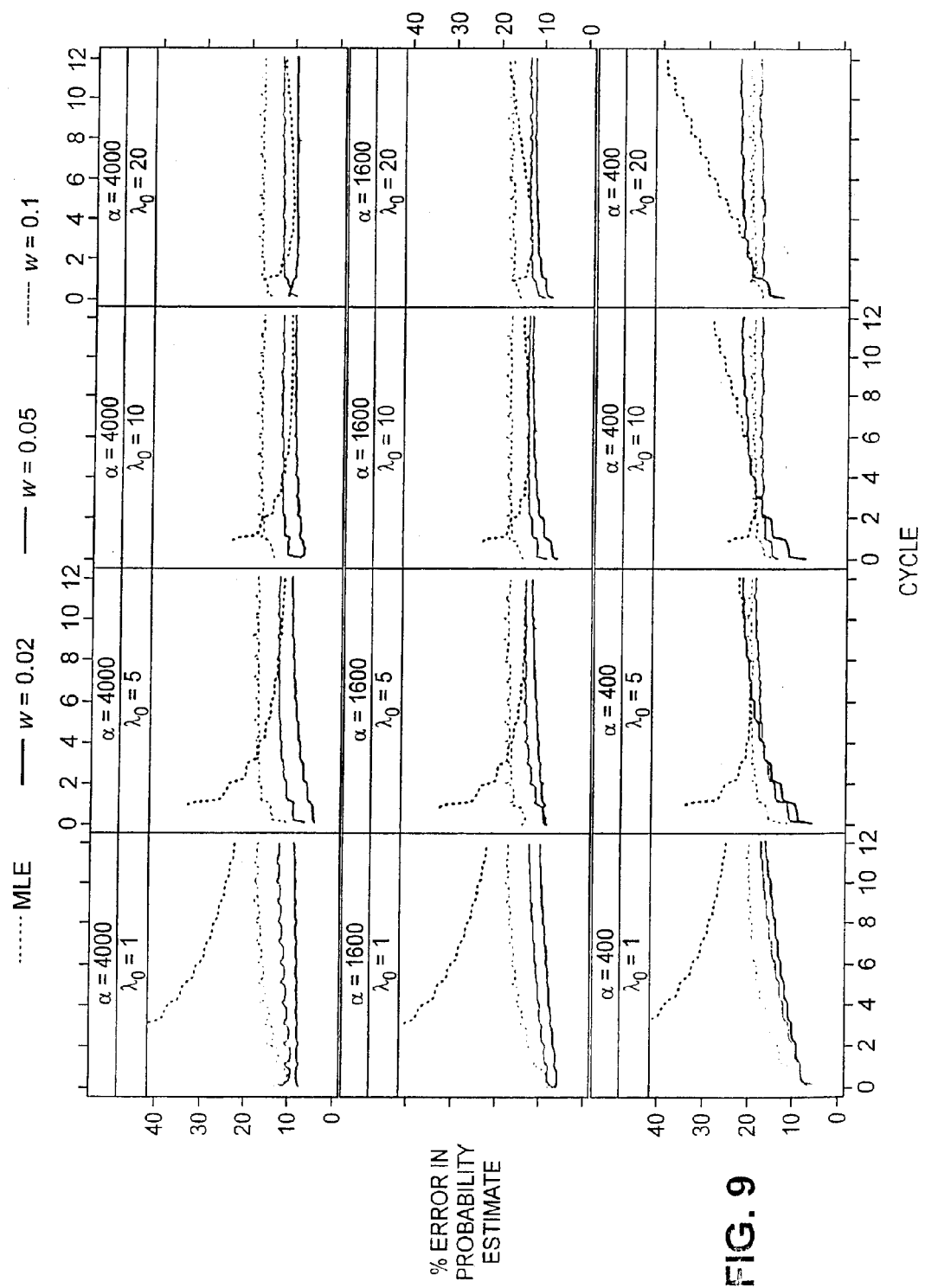
Figure 11:
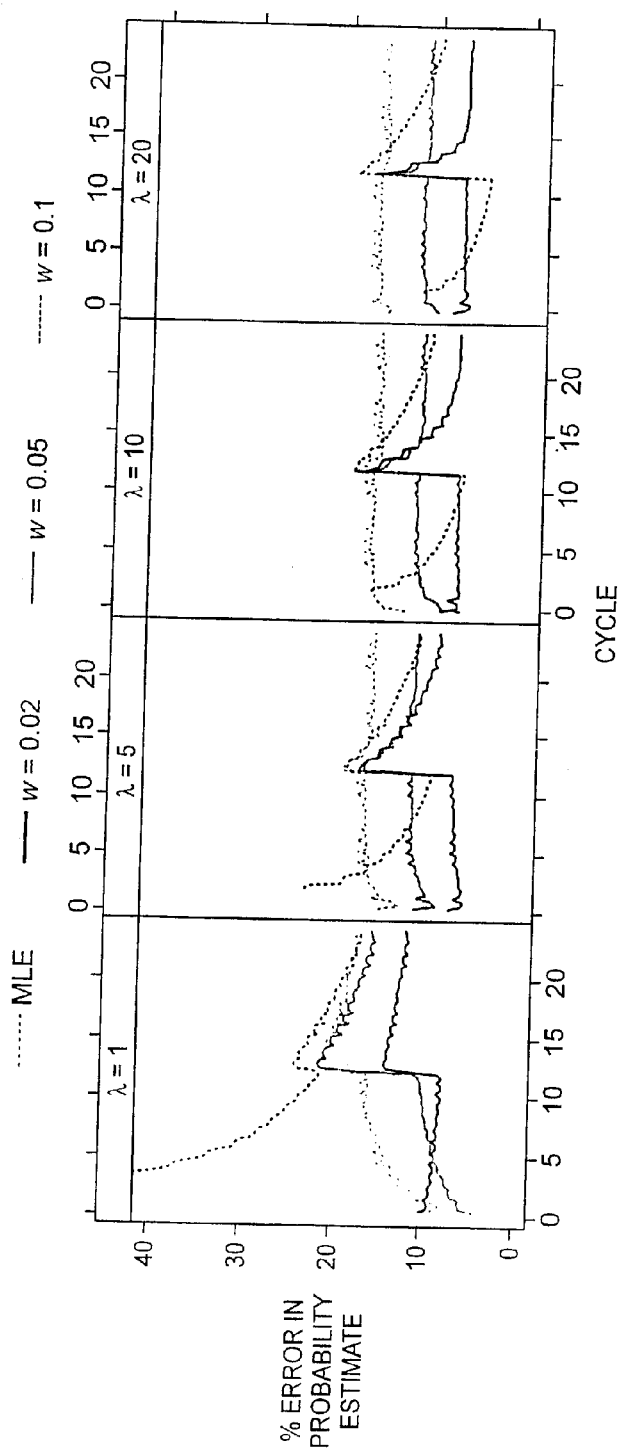

FIG. 11 shows the simulated absolute relative error curves for the first period probability for the MLE and the EDE with weights w=0.02, 0.05, and 0.1 over 24 cycles of the dynamic Poisson timing model with deterministic shifts in the period rates at the end of the 12th cycle. Each panel of the figure corresponds to a different transaction rate for the first 12 cycles, which is the same for all periods. The results shown in FIG. 11 indicate the following:

1. The EDE is able to absorb the shift in the rate considerably faster than the MLE.
2. Estimators with larger w adapt faster, but the absolute relative error rate stabilizes at a large value.
3. The EDE with w=0.02 offers the best trade-off between ability to adapt to change quickly and low average absolute relative error over the period.

The standard deviations (not shown) for the absolute relative error curves are very similar to the ones listed for the constant rate model in FIG. 7.

In summary, the MLE under the Poisson timing model with constant rates is generally not appropriate under dynamic Poisson models with high or moderate levels of noise and under Poisson models with shifts in the transaction rates. However, the EDE of the illustrative embodiment of the invention with w=0.02 performs well under a variety of scenarios.

The present invention in the illustrative embodiments described herein provides a fast, memory-efficient procedure for sequentially estimating timing distributions. The procedure uses only the times of the current and the last transaction to update the transaction rates and the period probabilities and can therefore be used with stream transaction data that are continuously collected over time. The EDE of the present invention is competitive with a conventional MLE under a Poisson timing model with constant rates and considerably better than the conventional MLE when transaction times follow a dynamic Poisson timing model. In the application to tracking the calling behavior of 2,000 customers described above, the Poisson timing model was shown to be reasonable for most individuals. The EDE performed well even for those customers for which the Poisson timing model may not be adequate. Similar performance improvements have been observed in numerous other applications.

It should be understood that the above-described embodiments of the invention are intended to be illustrative only, and the invention may be implemented in numerous other embodiments. For example, although the simulation results for the illustrative embodiments described above indicate that an appropriate weighting for the EDE under a dynamic Poisson model is about $1/\sqrt{\alpha}$, other embodiments may use other weights determined to be more appropriate for a given application. In addition, although the illustrative embodiments use fixed updating weights, the invention can also be used with updating weights that change with time. An one possible example of such an arrangement, if a transaction rate cannot be initialized reliably, then the updating weight can be larger for the first several transactions to allow the estimated rates and probabilities to move rapidly away from the initial value. Later, if the transaction rates become stable, the updating weight can be decreased to reduce the variability in the EDE. As another example, the updating weight may depend on the current estimate of the transaction rate. Furthermore, alternative embodiments of the invention may utilize different system configurations, different types of records and different updating processes. These and numerous other alternative embodiments within the scope of the following claims will be apparent to those skilled in the art.

What is claimed is:

1. A method of updating a record in a database system in conjunction with one or more transactions involving at least a portion of the record, the method comprising the steps of:
   determining a record affected by a given one of the transactions;
   retrieving a current version of the record from a memory of the system;
   estimating at least one of a transaction rate and a period probability for the record using an event-driven estimator based at least in part on application of at least a portion of a stochastic model of time-dependent behavior to the current version of the record, the model having associated therewith a plurality of periods and a number of period-based transaction rates; and
   generating an updated version of the record based on the event-driven estimator.

2. The method of claim 1 wherein the record comprises a signature associated with a particular customer for which information is stored in the database system.

3. The method of claim 1 wherein the model of time-dependent behavior comprises a constant rate Poisson timing model.

4. The method of claim 1 wherein the model of time-dependent behavior comprises a dynamic Poisson timing model.

5. The method of claim 1 wherein the model of time-dependent behavior comprises a Poisson timing model having deterministic shifts in one or more transaction rates.

6. The method of claim 1 wherein the event-driven estimator for a given one of the periods comprises a weighted average of a previous reciprocal transaction rate and a time since a previous transaction in the given period, and wherein the event-driven estimator for at least a subset of the other periods increases by an amount of time that has been spent in the given period since the previous transaction.

7. The method of claim 1 wherein the event-driven estimator is updated for every transaction in a specified one of the plurality of periods and at the end of each of at least a subset of the plurality of periods.

8. The method of claim 1 wherein the event-driven estimator is updated for every transaction, regardless of which of the plurality of periods any particular transaction falls in, but not at the end of each of the plurality of periods.

9. The method of claim 1 wherein the event-driven estimator is updated for a given one of the plurality of periods only when there is a transaction occurring within that period.

10. The method of claim 1 wherein the event-driven estimator is updated once for a given one of the plurality of periods after a plurality of transactions occurring within that period.

11. The method of claim 1 wherein the event-driven estimator first generates an estimated transaction rate $\hat{\lambda}_{j,n}$ for period j and a given transaction n, and then generates an estimated period probability $\hat{\pi}_{j,n}$ for period j as $$\hat{\lambda}_{j,n} / \sum_k \hat{\lambda}_{k,n}.$$

12. The method of claim 1 wherein an estimated transaction rate $\hat{\lambda}_{j,n}$ under the model satisfies $$\hat{\lambda}_{j,n}^{-1} = \begin{cases} (1-w)\hat{\lambda}_{j,n-1}^{-1} + wZ_{j,n}, & \text{if transaction } n \text{ falls in period } j \\ \hat{\lambda}_{j,n-1}^{-1} + \frac{w}{1-w}Z_{j,n}, & \text{if transaction } n \text{ does not fall in period } j, \end{cases}$$

wherein w denotes a specified updating weight, $Z_{j,n}$ is an elapsed time in period j since a previous transaction n−1, and $\hat{\lambda}_{j,n}^{-1}$ is a reciprocal rate that estimates the average time between transactions in period j.

13. An apparatus for updating a record in a database system in conjunction with one or more transactions involving at least a portion of the record, the apparatus comprising:

a memory for storing at least a portion of the record; and a processor coupled to the memory and operative to determine a record affected by a given one of the transactions; to retrieve a current version of the record from a memory of the system; to estimate at least one of a transaction rate and a period probability for the record using an event-driven estimator based at least in part on application of at least a portion of a stochastic model of time-dependent behavior to the current version of the record, the model having associated therewith a plurality of periods and a number of period-based transaction rates; and to generate an updated version of the record based on the event-driven estimator.

14. The apparatus of claim 13 wherein the record comprises a signature associated with a particular customer for which information is stored in the database system.

15. The apparatus of claim 13 wherein the model of time-dependent behavior comprises a constant rate Poisson timing model.

16. The apparatus of claim 13 wherein the model of time-dependent behavior comprises a dynamic Poisson timing model.

17. The apparatus of claim 13 wherein the model of time-dependent behavior comprises a Poisson timing model having deterministic shifts in one or more transaction rates.

18. The apparatus of claim 13 wherein the event-driven estimator for a given one of the periods comprises a weighted average of a previous reciprocal transaction rate and a time since a previous transaction in the given period, and wherein the event-driven estimator for at least a subset of the other periods increases by an amount of time that has been spent in the given period since the previous transaction.

19. The apparatus of claim 13 wherein the event-driven estimator is updated for every transaction in a specified one of the plurality of periods and at the end of each of at least a subset of the plurality of periods.

20. The apparatus of claim 13 wherein the event-driven estimator is updated for every transaction, regardless of which of the plurality of periods any particular transaction falls in, but not at the end of each of the plurality of periods.

21. The apparatus of claim 13 wherein the event-driven estimator is updated for a given one of the plurality of periods only when there is a transaction occurring within that period.

22. The apparatus of claim 13 wherein the event-driven estimator is updated once for a given one of the plurality of periods after a plurality of transactions occurring within that period.

23. The apparatus of claim 13 wherein the event-driven estimator first generates an estimated transaction rate $\hat{\lambda}_{j,n}$ for period j and a given transaction n, and then generates an estimated period probability $\hat{\pi}_{j,n}$ for period j as $\hat{\lambda}_{j,n}/\Sigma_k \hat{\lambda}_{k,n}$.

24. The apparatus of claim 13 wherein an estimated transaction rate $\hat{\lambda}_{j,n}$ under the model satisfies $$\hat{\lambda}_{j,n}^{-1} = \begin{cases} (1-w)\hat{\lambda}_{j,n-1}^{-1} + wZ_{j,n}, & \text{if transaction } n \text{ falls in period } j \\ \hat{\lambda}_{j,n-1}^{-1} + \frac{w}{1-w}Z_{j,n}, & \text{if transaction } n \text{ does not fall in period } j, \end{cases}$$

wherein w denotes a specified updating weight, $Z_{j,n}$ is an elapsed time in period j since a previous transaction n−1, and $\hat{\lambda}_{j,n}^{-1}$ is a reciprocal rate that estimates the average time between transactions in period j.

25. An article of manufacture comprising a machine-readable storage medium for storing one or more programs for use in updating a record in a database system in conjunction with one or more transactions involving at least a portion of the record, wherein the one or more programs when executed implement the steps of:

determining a record affected by a given one of the transactions;

retrieving a current version of the record from a memory of the system;

estimating at least one of a transaction rate and a period probability for the record using an event-driven estimator based at least in part on application of at least a portion of a stochastic model of time-dependent behavior to the current version of the record, the model having associated therewith a plurality of periods and a number of period-based transaction rates; and generating an updated version of the record based on the event-driven estimator.

* * * * *

UNITED STATES PATENT AND TRADEMARK OFFICE
CERTIFICATE OF CORRECTION

PATENT NO. : 6,549,919 B2
DATED : April 15, 2003
INVENTOR(S) : Lambert et al.

It is certified that error appears in the above-identified patent and that said Letters Patent is hereby corrected as shown below:

Please replace title page with the attached title page.

Please delete drawing sheets 1-9 and insert the attached drawing sheets 1-9.

Signed and Sealed this

Twentieth Day of April, 2004

JON W. DUDAS
*Acting Director of the United States Patent and Trademark Office*

(12) United States Patent
Lambert et al.

(10) Patent No.: US 6,549,919 B2
(45) Date of Patent: Apr. 15, 2003

(54) METHOD AND APPARATUS FOR UPDATING RECORDS IN A DATABASE SYSTEM BASED ON AN IMPROVED MODEL OF TIME-DEPENDENT BEHAVIOR

(75) Inventors: Diane Lambert, Berkeley Heights, NJ (US); José C. Pinheiro, Chatham, NJ (US); Don X. Sun, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 242 days.

(21) Appl. No.: 09/733,656

(22) Filed: Dec. 8, 2000

(65) Prior Publication Data

US 2003/0028502 A1 Feb. 6, 2003

Related U.S. Application Data

(60) Provisional application No. 60/194,316, filed on Apr. 3, 2000.

(51) Int. Cl.$^7$ .................................................. G06F 17/30
(52) U.S. Cl. ......................................................... 707/203
(58) Field of Search ................................. 707/203, 102, 707/200; 705/60; 710/317; 725/22

(56) References Cited

U.S. PATENT DOCUMENTS

| | | | |
|---|---|---|---|
| 5,870,752 A | | 2/1999 | Gibbons et al. |
| 5,907,602 A | * | 5/1999 | Peel et al. ............... 379/114.14 |
| 5,912,905 A | * | 6/1999 | Sakai et al. .................. 714/784 |
| 6,012,064 A | * | 1/2000 | Gibbons et al. ........ 707/103 R |
| 6,381,589 B1 | * | 4/2002 | Leon ........................... 705/60 |

OTHER PUBLICATIONS

F. Chen et al., "Incremental Quantile Estimation For Massive Tracking," Proceedings of KDD-2000, pp. 516-522, 2000.

M. West et al., "Introduction to the DLM: The First-Order Polynomial Model," Bayesian Forecasting and Dynamic Models, Chapter 2, Springer Verlag, pp. 37-55, 1989.

B. Abraham et al., "Locally Constant Mean Model and Simple Exponential Smoothing," Statistical Methods for Forecasting, John Wiley and Sons, pp. 85-89, 1983.

P.B. Gibbons et al., "Fast Incremental Maintenance of Approximate Histograms," Proceedings of the 23rd VLDB Conference, Athens, Greece, 5 pages, 1997.

* cited by examiner

*Primary Examiner*—Safet Metjahic
*Assistant Examiner*—Sana Al-hashemi
(74) *Attorney, Agent, or Firm*—Ryan, Mason & Lewis, LLP

(57) ABSTRACT

A customer signature or other type of record in a database system is updated using an event-driven estimator based on a model of time-dependent behavior. In a preferred embodiment, a current version of a record affected by a given transaction is retrieved from a memory of the system and an event-driven estimator of at least one of a transaction rate and a period probability for the record is determined based at least in part on a dynamic Poisson timing model having a number of periods and corresponding period-based transaction rates associated therewith. The event-driven estimator may be configured so as to generate an estimated transaction rate $\hat{\lambda}_{j,n}$ for period j and a given transaction n, and then to generate an estimated period probability $\pi_{j,n}$ for period j as $\hat{\lambda}_{j,n}/\Sigma_k \hat{\lambda}_{k,n}$. An updated version of the record may then be generated based on the event-driven estimator.

25 Claims, 8 Drawing Sheets

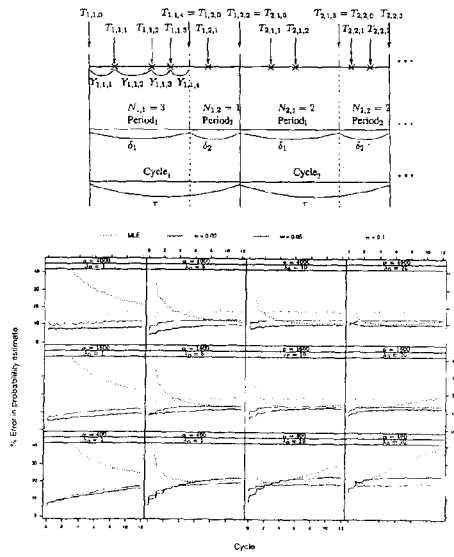

|   | | EDE | | |
|---|---|---|---|---|
| $\lambda$ | MLE | $w = .02$ | $w = .05$ | $w = .1$ |
| 1 | .25 (.16,.57) | .04 (.01,.05) | .07 (.03,.08) | .11 (.06,.13) |
| 5 | .11 (.07,.24) | .05 (.02,.06) | .09 (.06,.1) | .13 (.08,.14) |
| 10 | .08 (.05,.17) | .05 (.03,.06) | .09 (.08,.1) | .13 (.09,.14) |
| 20 | .05 (.04,.12) | .05 (.03,.06) | .09 (.07,.09) | .13 (.11,.14) |

FIG. 7

|   | | EDE | | |
|---|---|---|---|---|
| $\lambda$ | MLE | $w = .02$ | $w = .05$ | $w = .1$ |
| 1 | .27 (.20,.58) | .11 (.04,.15) | .1 (.03,.13) | .13 (.05,.16) |
| 5 | .18 (.17,.26) | .15 (.05,.19) | .14 (.07,.16) | .16 (.08,.18) |
| 10 | .21 (.16,.28) | .18 (.08,.21) | .15 (.08,.16) | .16 (.13,.18) |
| 20 | .30 (.17,.49) | .20 (.11,.21) | .15 (.09,.16) | .16 (.13,.18) |

FIG. 10